Sept. 11, 1934.  V. H. DAKE  1,972,980
ELECTRIC SIGNALING AND RECORDING SYSTEM
Filed July 23, 1932  12 Sheets-Sheet 1
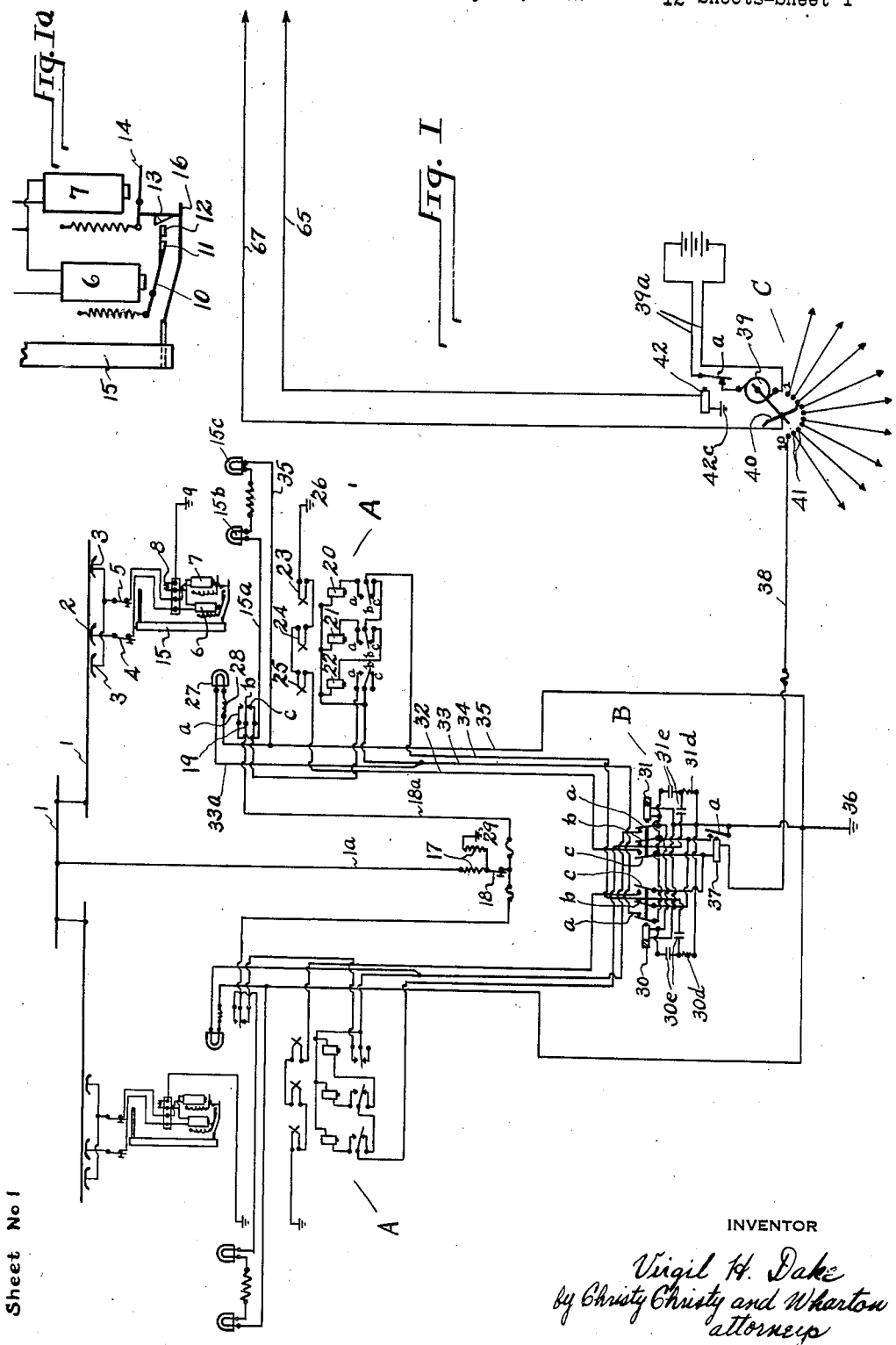
INVENTOR
Virgil H. Dake
by Christy Christy and Wharton
attorneys

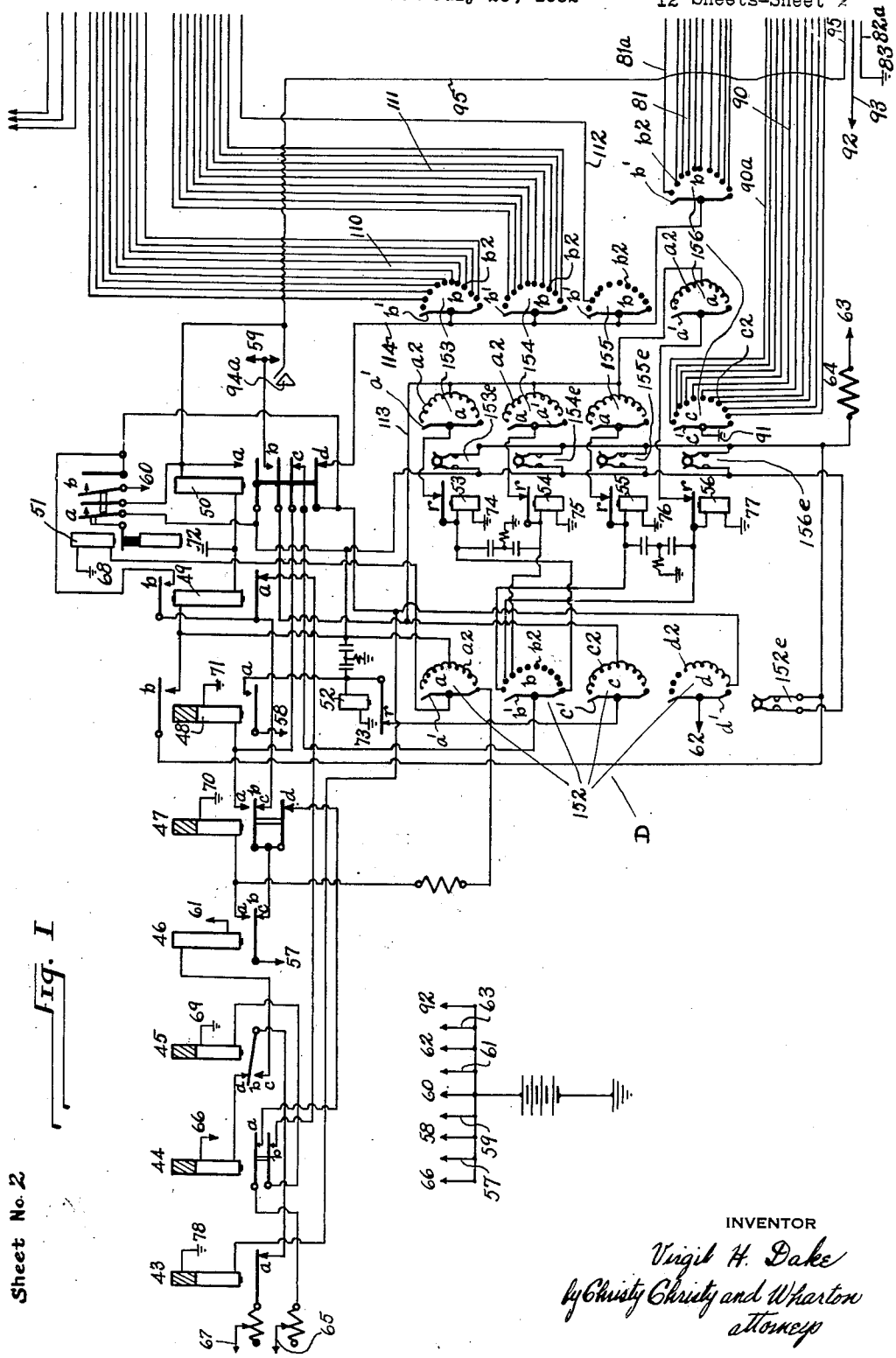

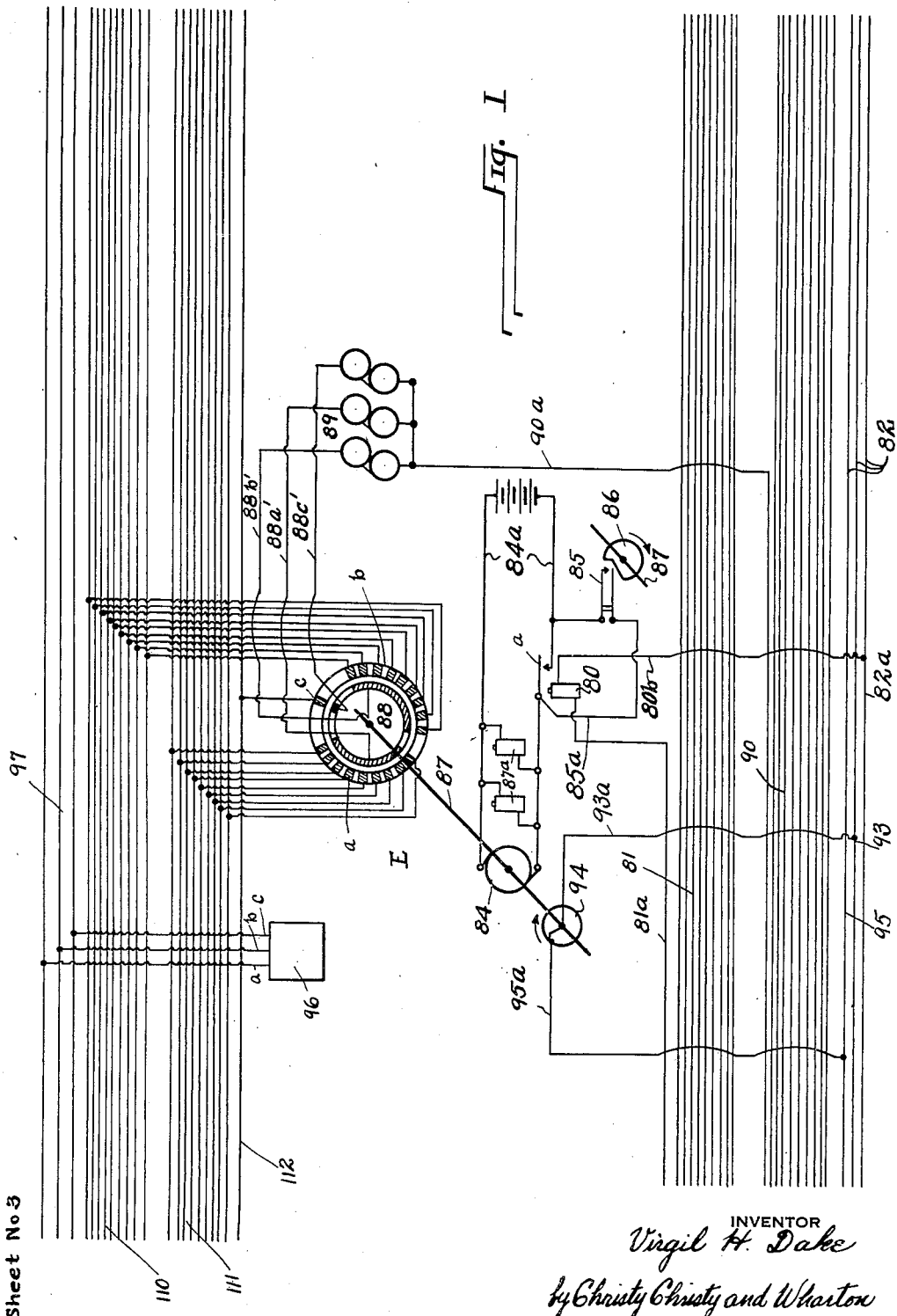

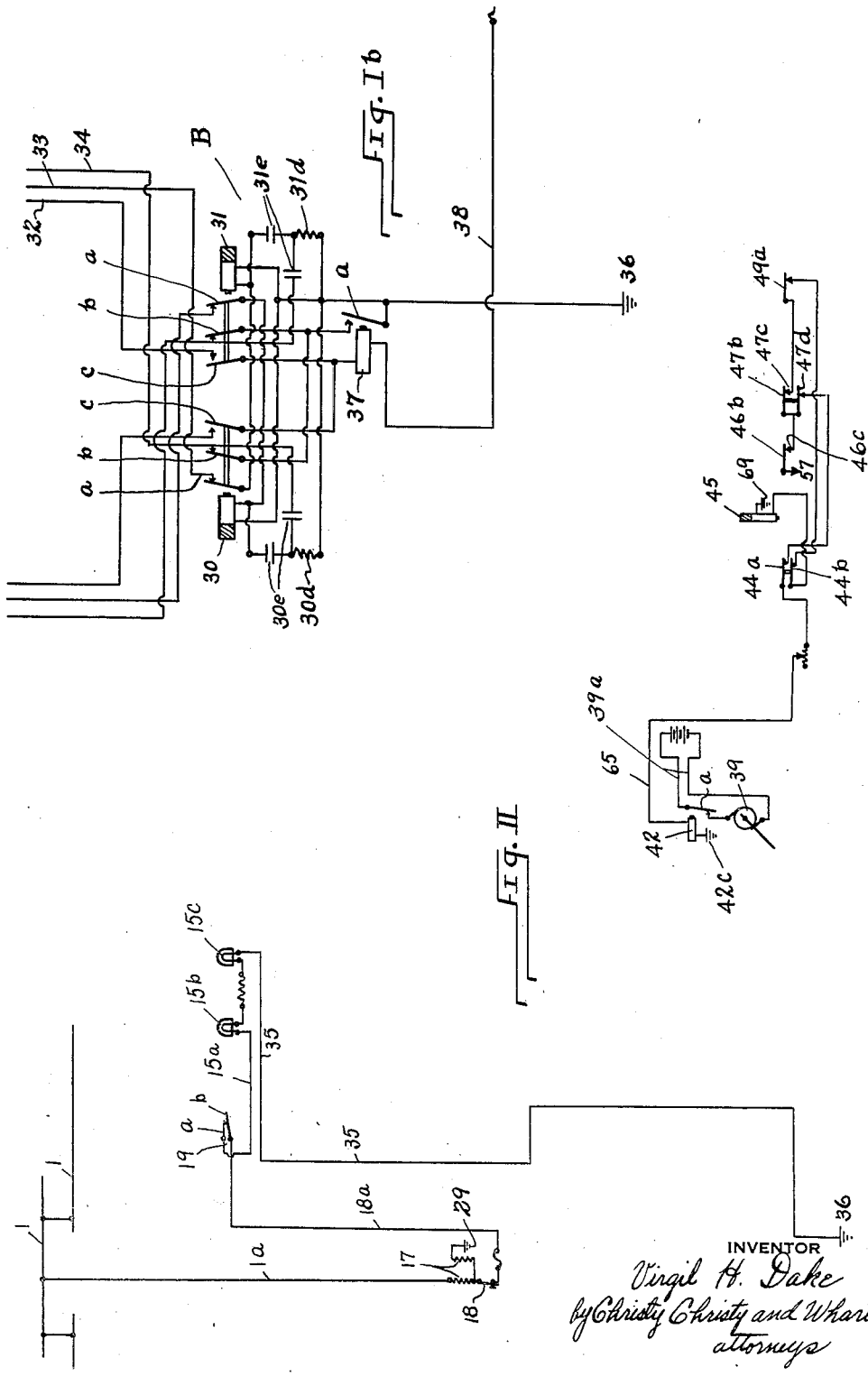

Sept. 11, 1934.　　　　V. H. DAKE　　　　1,972,980
ELECTRIC SIGNALING AND RECORDING SYSTEM
Filed July 23, 1932　　12 Sheets-Sheet 5
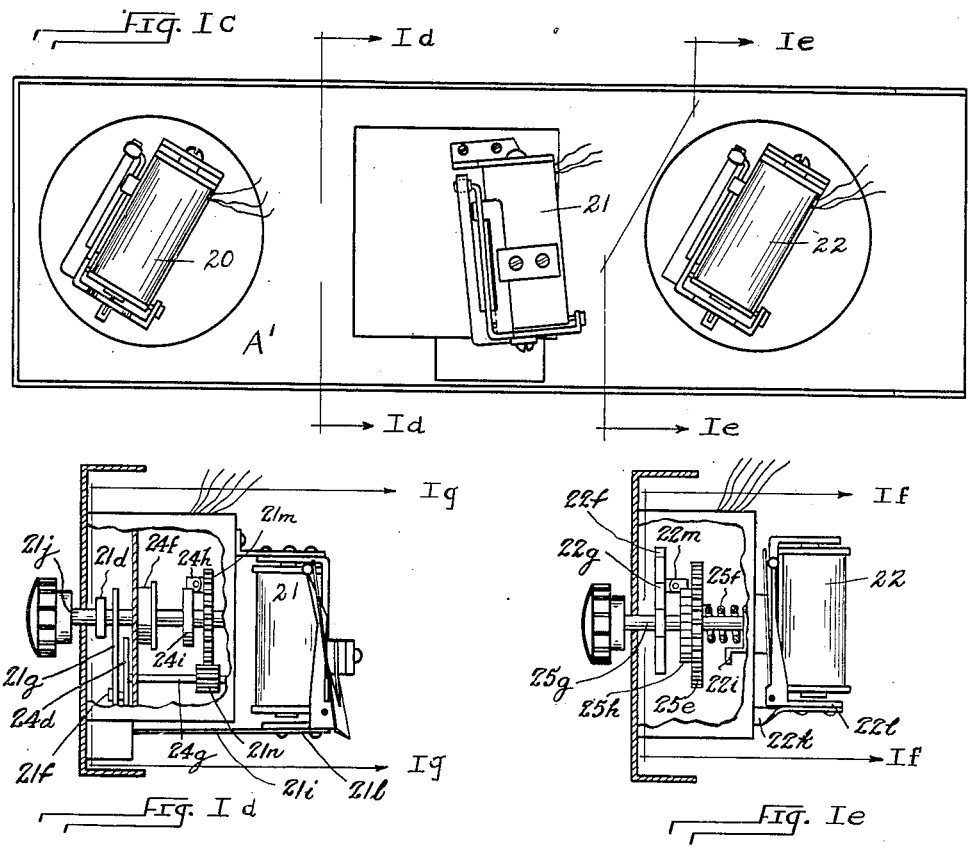
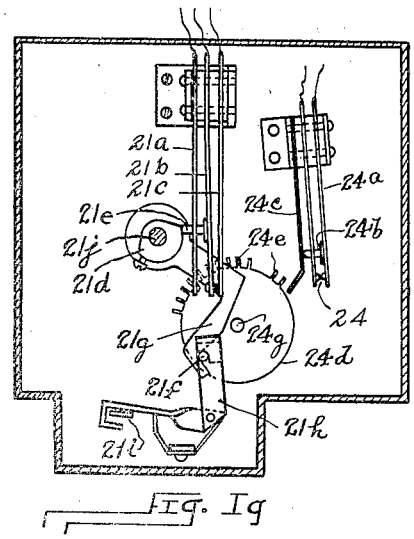
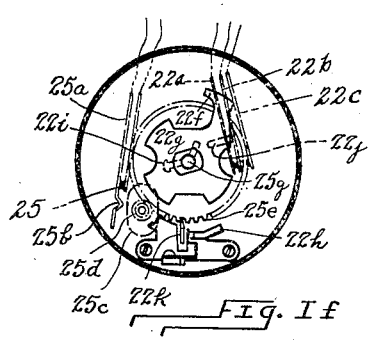
INVENTOR
Virgil H. Dake
by Christy Christy and Wharton
attorneys

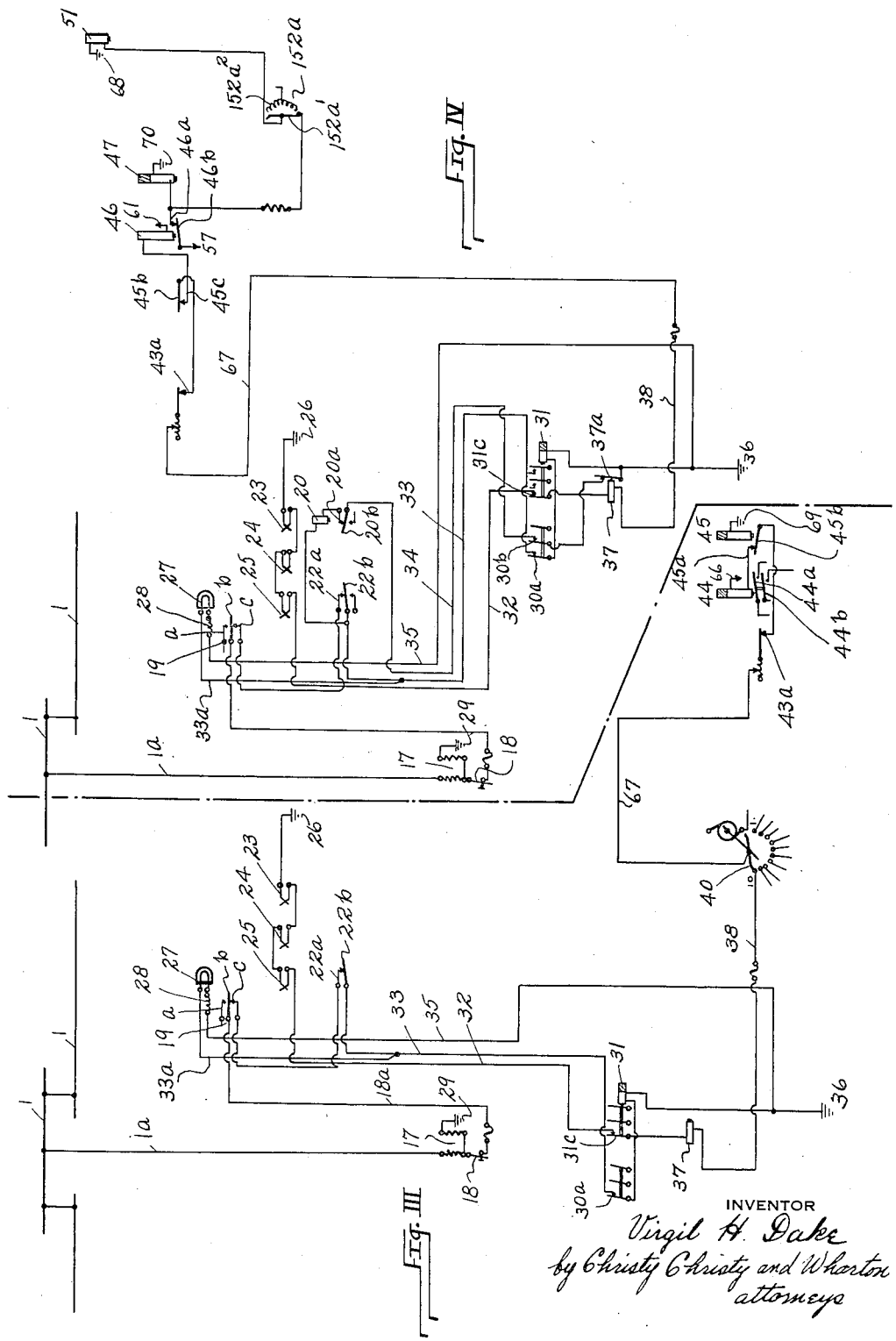

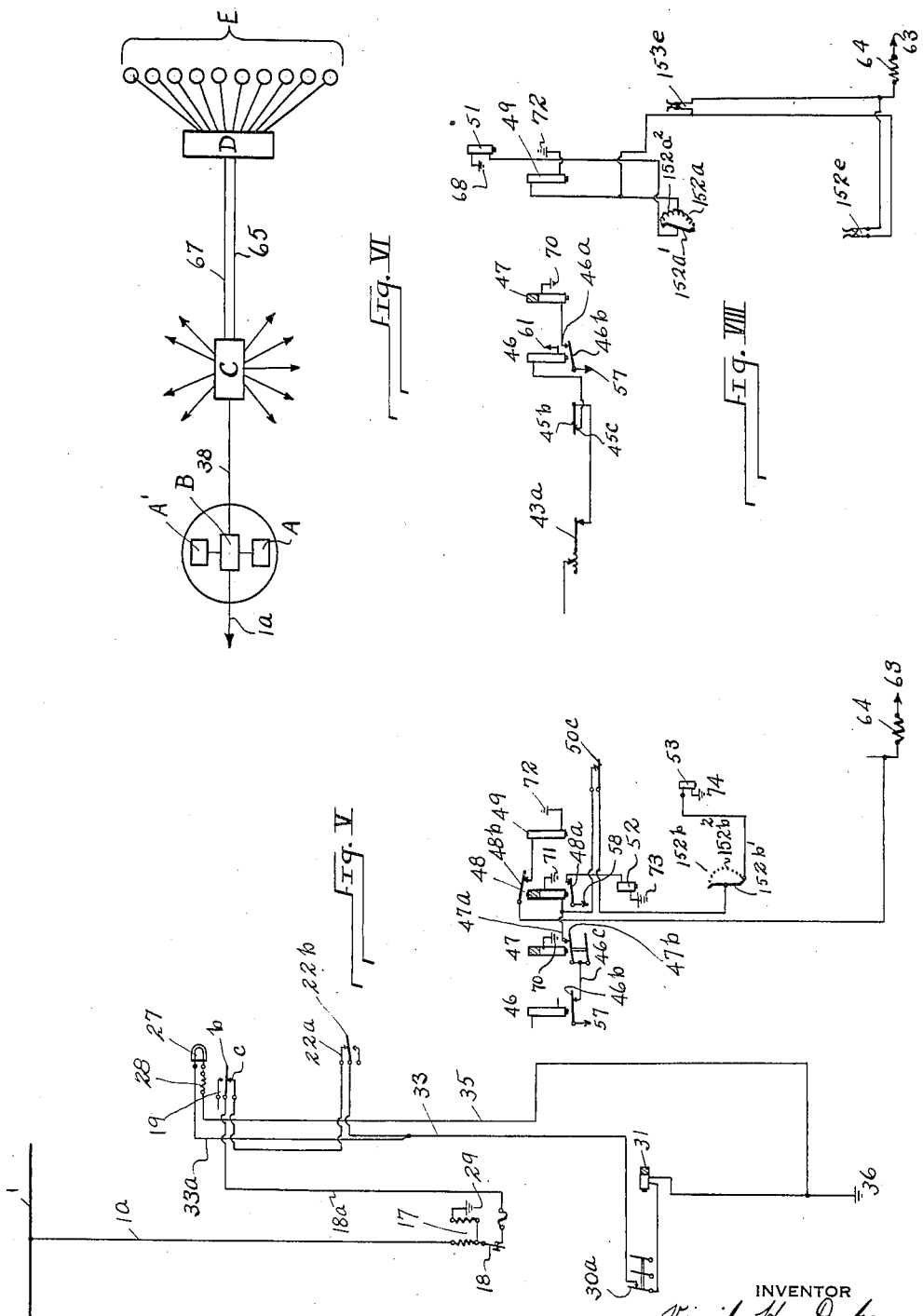

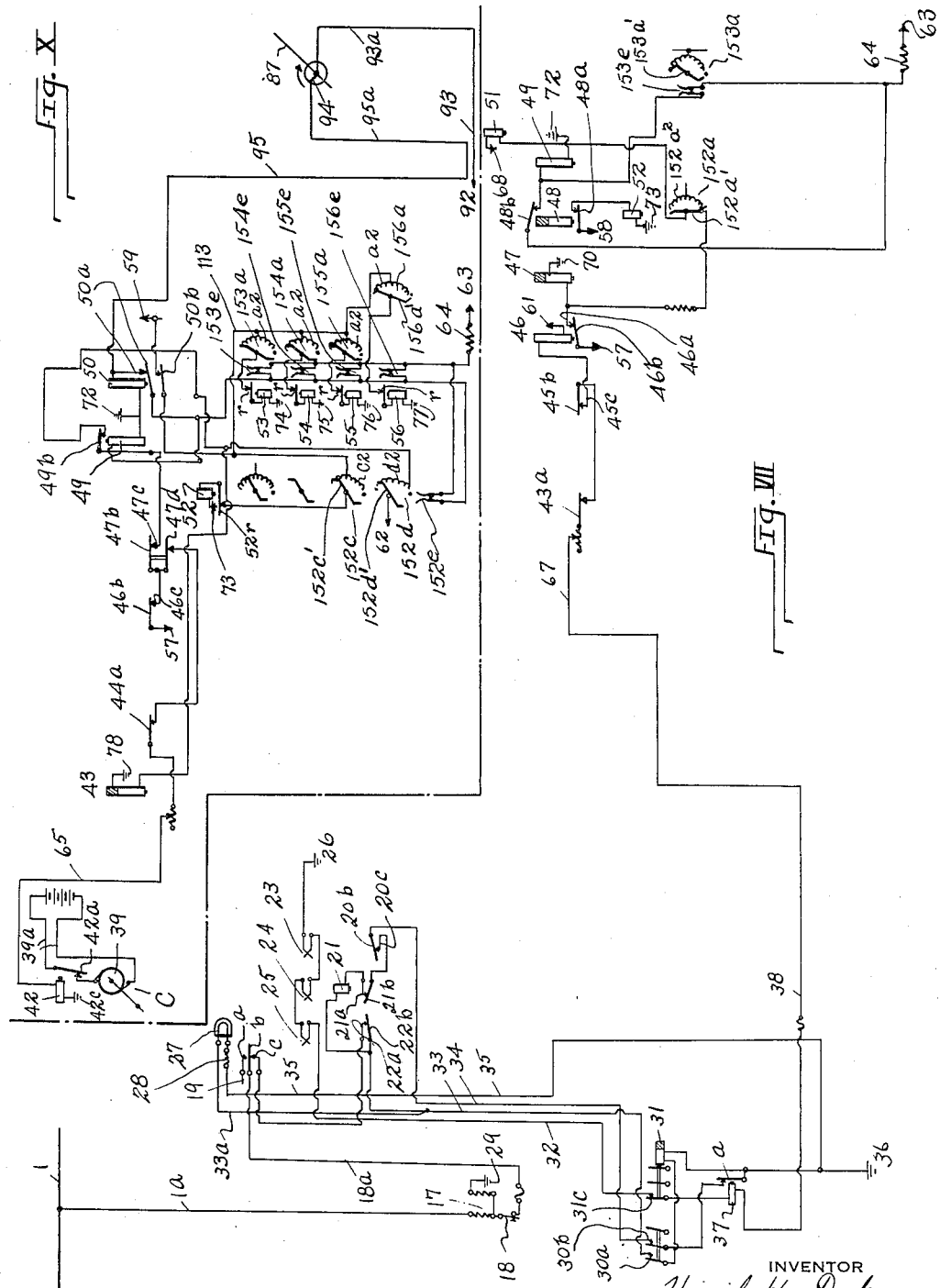

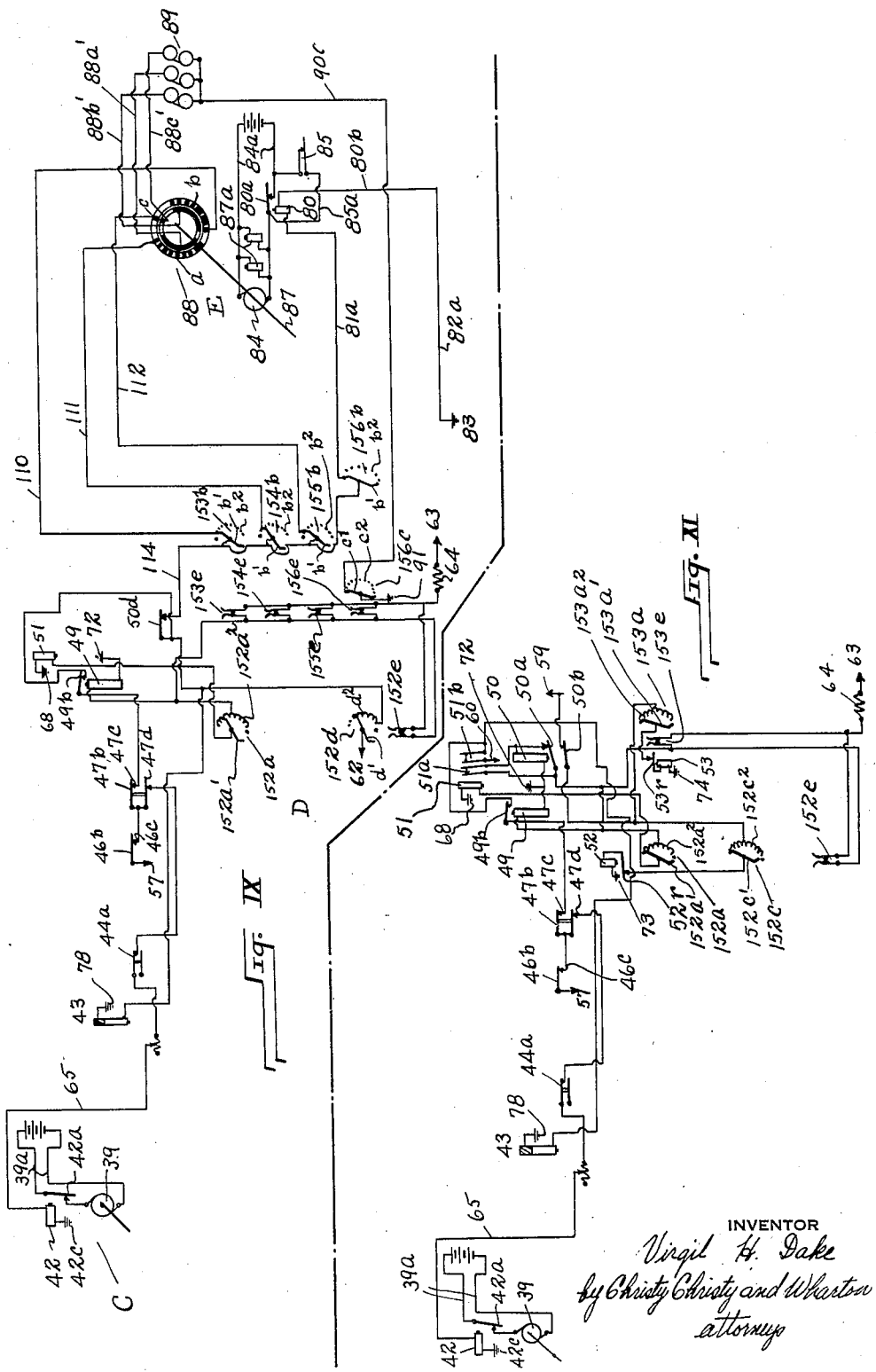

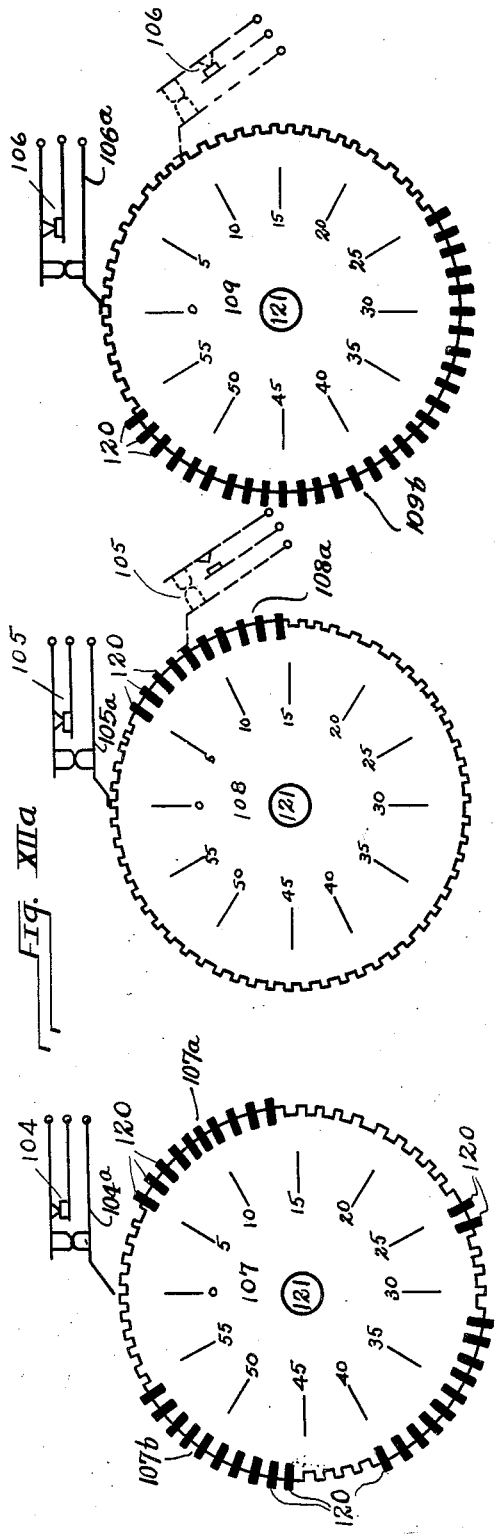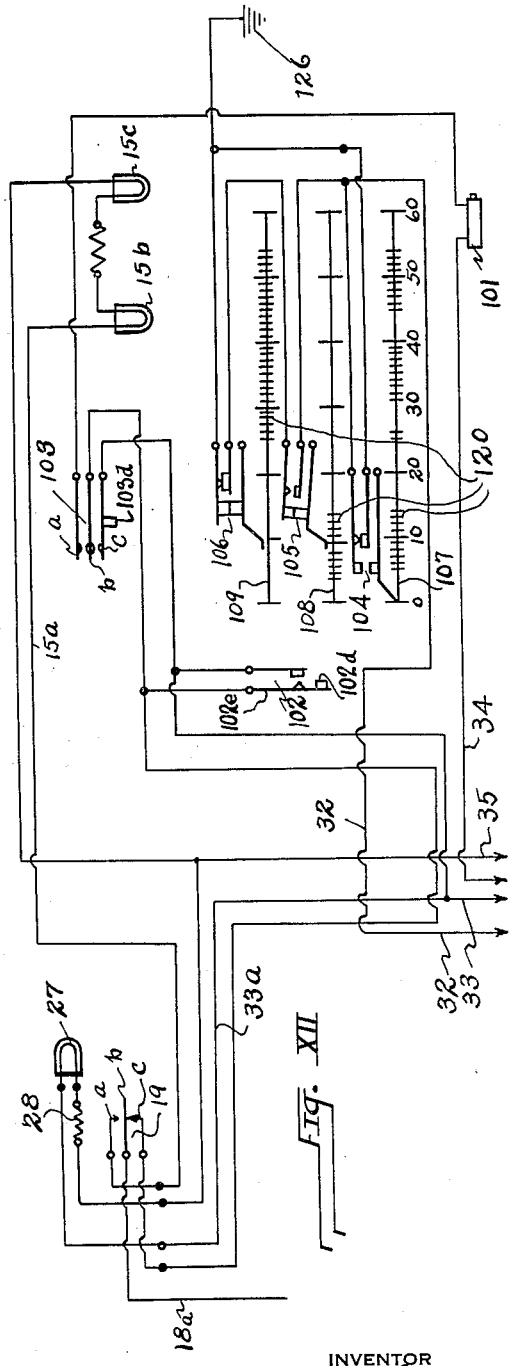

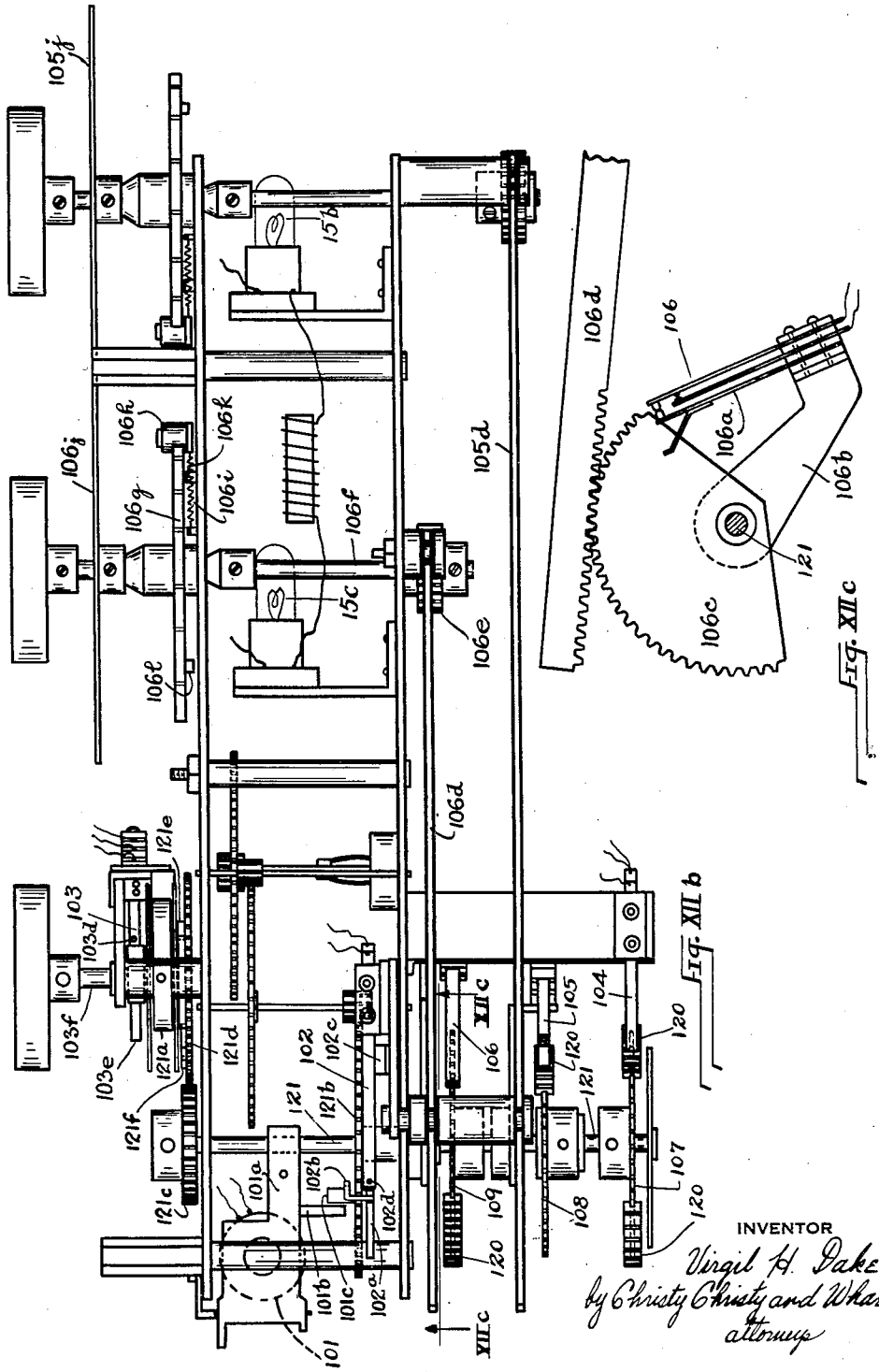

Sept. 11, 1934.  V. H. DAKE  1,972,980
ELECTRIC SIGNALING AND RECORDING SYSTEM
Filed July 23, 1932   12 Sheets-Sheet 12
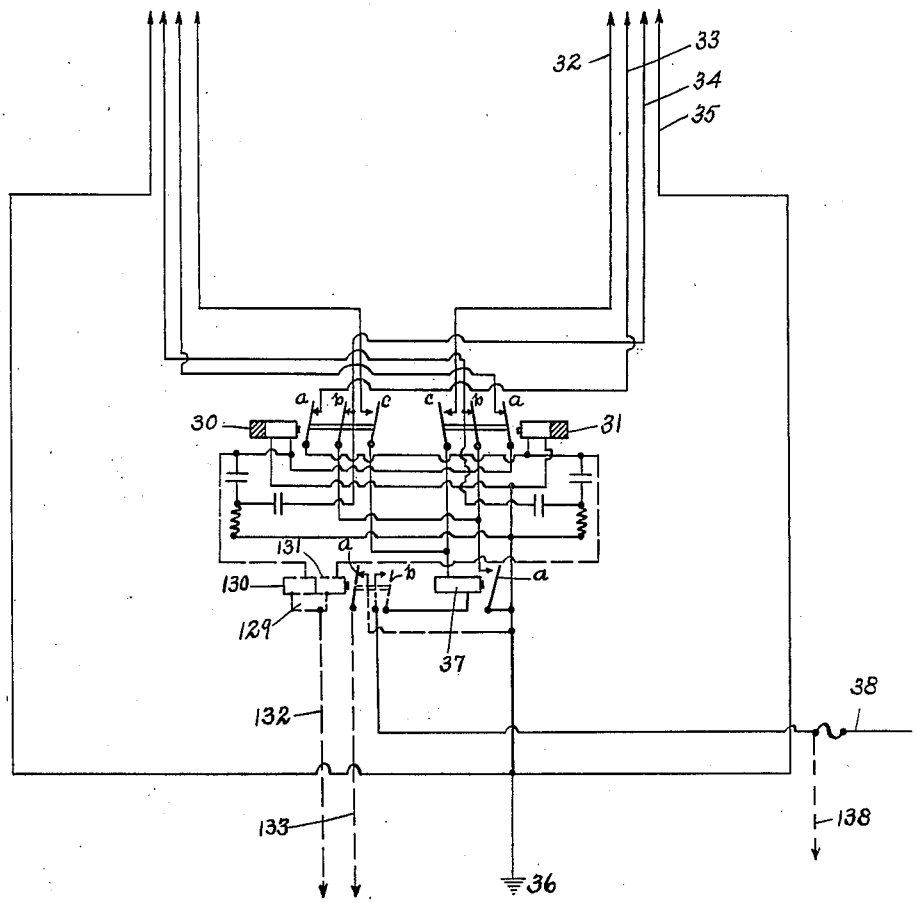
Fig. XIII
INVENTOR
Virgil H. Dake
by Christy Christy and Wharton
attorneys Patented Sept. 11, 1934

1,972,980

UNITED STATES PATENT OFFICE 1,972,980

ELECTRIC SIGNALING AND RECORDING SYSTEM

Virgil H. Dake, Pittsburgh, Pa.

Application July 23, 1932, Serial No. 624,161

19 Claims. (Cl. 234—37.5)

This invention relates to an electric signaling and recording system.

This system is so organized that it is capable of receiving and accumulating for transmission variable signals. It is capable of discriminating between the transmitters of a transmitting station; it is capable of selecting the transmitting station having a "set-up" message or signal from a number of transmitters; it is capable of storing in a "set-up" transmitter the message which has been set up therein pending the selection of that transmitter; it is capable of transmitting the message or signal from a transmitter at a point remote from the central station along a single earth-return line common to all transmitting stations of the system to a central station accumulator. The system is capable of setting up in the accumulator all the elements of the signal or message transmitted, and of selectively releasing for action recording mechanism in accordance with the message and transmitting station identification set-up in the accumulator.

The system is further so organized as to the accumulating and control elements that, if there be abnormal action in the elements of the system during the transmission of a message or signal, or abnormal condition in an interval between signal transmission, the system is automatically cleared for the transmission, accumulation and recording of a subsequent message from any transmitter of the system.

The system, as herein illustrated and described, is purposed more particularly for recording at a central operating station the arrival and departure of electric railway cars at remote points. It is, therefore, so arranged that its operation is, to the greatest extent, practicable, automatic, and so that special selection on the part of the car operator is minimized and is made simple and readily understandable. There are, however, various other applications of use for the system in transmitting figures or code to a central station, from a number of remote points, in an automatic manner, and over a length of single conducting wire. The system, fundamentally as illustrated and described herein, may thus be modified to transmit information from a number of outlying stations of any nature to a central station, and to automatically accumulate and record such information.

In considering the system, it is convenient initially to treat it as of several arbitrarily divided elements. Thus, each transmitting station, as shown and described, comprises two transmitters, which are automatically rendered operable, and which are manually operated to set up the appropriate message or signal; and a discriminator to withhold from interference with the operable transmitter another transmitter in the station, and which is also connected with the discriminator. A number of transmitting stations are described as located at the terminal points of street railway routes.

Another element of the system is a selector, which is installed at a point which is desirably as close as possible to all the transmitting stations of the system. This selector functions to clear, and to hold clear, a main line for transmission of a message or signal from any one of the various transmitting stations which has one of its transmitters set up to produce a message or signal. Since it controls the use of a single line selectively for a number of outlying stations, the selector, when disposed in a central position with respect to these stations, economizes in the transmitting line by directing messages or signals from all of the transmitting stations selectively over a single line to the central station.

The accumulator is located at the central station. It should be understood initially that the accumulator apparatus occupies very little space, and that the line from the selector of the system to the accumulator may be of relatively great length, for example, a number of miles. As I have installed my system, the limit of distance between the transmitter, or the selector, and the accumulator at the central station is the distance over which common telegraph instruments are operable with a single earth-return line. By decreasing the line resistance, however, as by utilizing wire of large diameter, or increased conductivity, or by utilizing pulsing repeating instruments common in the art of telegraphy, the range between the selector and accumulator of the system may be indefinitely increased.

In the system, the accumulator performs various functions. It controls the selector action; it initiates release of a "set-up" transmitter; it selectively accumulates the elements of a complete message or signal for recording; it initiates action of the recording instrumentalities; it restores itself and the line to condition for reception of a subsequent message or signal after the reception, accumulation, and recording of each complete message or signal, and if an incomplete message be received by the accumulator, due to abnormal operation in the system, it none the less restores itself and the line to condition for reception of another message.

The recording apparatus of the system is also located at the central station and may desirably be in close physical relation with the accumulator. The recorder makes record of messages which have been received and set up in accumulated form by the accumulator. Its action is initiated by the accumulator, and in normal operation of the system the recorder in turn acts upon the accumulator to initiate the action by which the accumulator clears itself and the other elements of the system upon the reception and recording of a complete message.

In order that the invention may be readily understood, I shall describe generally the apparatus employed, and shall describe the parts and arrangements specifically in connection with the operation of the system. In illustrating the system and its operation, I show the complete system considered as a complete wiring and operable layout, and illustrate different stages or conditions of the system as they occur, preparatory to, during, and after the transmission and accumulation of a message. It is desirable that these stages in the operation of the system shall be initially described in a general manner, in order that the brief description of the drawings may be readily understandable.

A brief description of all the figures of the drawings is given hereinafter, following the general discussion of the apparatus comprised under the headings "Description of transmitter and discriminator arrangement and wiring," "Description of accumulator arrangement and wiring," and "Recorder arrangement and wiring." The subject matter treated under these headings is shown generally in Figures I, Ia, and Ib of the drawings, and the details of one suitable form of transmitter are shown in Figures Ic to Ig inclusive.

I refer, therefore, initially only to Figure I, and to Figures Ia, and Ib, of the drawings, illustrating the presence, positioning, and wiring of the various elements and arrangements of the system. With Figure I of the drawings under consideration, A and A' represent two transmitters, the arrival and departure transmitters of a single electric railway terminal, and B represents the discriminator of the same terminal station, which, as described, permits operation of the one of these two transmitters which has been rendered operable, withholding from interference with it, during operation and activity, the other transmitter of the station.

The selector C comprises a number of stationary contact points, each of which leads by way of a single earth return line to the discriminator of one of a number of transmitting stations. A double-armed wiper is passed over these transmitter line contacts by means of a driving motor. The selector thus acts to connect one transmitting station at a time with the accumulator and recorder, the transmitting station selectively placed in line by the selector being the one in which a message has been set up for transmission, accumulation, and recording. The selector, under the influence of the accumulator, maintains a transmitting station, in which a message has been set up in the line until the transmission of its message has been completed, irrespective of the setting up of a transmitter in another or other transmitting station or stations during transmission from the initial station selected.

The accumulator, designated generally by reference letter D, comprises a plurality of relays of diversified resistance and diversified speed of operation; a plurality of current sources and connections to ground; a plurality of multiple bank switches; and a plurality of interconnections between relays and switches, and to the lines leading to the selector and to the recorders.

Each recorder E of the system (one being shown schematically) consists primarily of a recording time clock, with its operating means and controlling relays so arranged that it operates in accordance with messages set up on the multiple bank switches of the accumulator, and that its operation is initiated by accumulator action.

*Description of transmitter and discriminator arrangement and wiring*

Referring to the portion of Figure I showing the diagrammatic representation of operating elements, and wiring diagram, of the transmitters and discriminator of a single transmitting station, and to Figure Ia and Ib of the drawings, we will consider only one of the transmitters specifically, this being the transmitter designated by the reference letter A'. It must be assumed that this transmitter is mounted in a suitable casing on a trolley pole or other convenient support and is provided with a door which is normally locked to prevent tampering with the operating mechanism. The door as illustrated is not shown mechanically, but is introduced into the electrical connections merely to illustrate the manner in which its locking and unlocking is controlled, it being understood that it may be simply a hinged door of ordinary construction applied to a casing of ordinary construction. In order that the door of the transmitter casing may be locked, save at such times as an authorized person may in his course of duty require access to the transmitter, the door lock is associated with railway conductor, shown as the trolley wire 1, in such manner that car passage may serve to unlock and relock the door.

In the drawings, reference numeral 1 designates the trolley wire, and reference numerals 2 and 3, designate contactors arranged to be contacted by a trolley wheel. Contact of trolley with contactor 2, completes a circuit through switch 4, unlock magnet solenoid 6, and resistance 8, to a ground 9. The completion of this circuit energizes unlock magnet 6, causing it to pull its armature 10. Armature 10 carries a latch 11, which in latching position co-operates with projection 12 on the door 15 to latch the door. When unlock magnet solenoid 6 is energized and armature 10 is drawn, latch 11 is removed from its latching position, unlocking the door, and permitting access to the operable parts of the transmitter.

It will be understood that a trolley does not remain in contact with door unlocking contactor 2 for any appreciable length of time, and it is necessary that the door remain in unlocked condition after passage of the trolley beyond the contactor. When, therefore, unlock magnet solenoid 6 is de-energized by the passage of the trolley wheel from contactor 2, armature 10, carrying latch 11, is withheld from locking position, to permit the operator of the trolley car to open the door, by engagement with a catch 13 on the armature 14 of lock magnet 7.

A pair of trolley contactors 3 is provided, one of each such contactors being positioned on each side of the contactor 2. Both of these contactors are connected in a circuit completed through switch 5, lock magnet solenoid 7, and resistance 8, to the ground 9. Trolley wheel contact with either one of the contactors 3 therefore energizes lock magnet solenoid 7 to pull its armature 14. It will be noticed that armature 14 is of a general bell crank form, so that catch 13 on the armature 14 is disengaged from armature 10 of unlock magnet 6. This action relocks door 15, by permitting reengagement of latch 11 on armature 10 with door projection 12, it being assumed that door 15 has remained closed, not having been opened for the transmission of a message.

If, prior to the passage of the trolley wheel through contactor 3, door 15 is opened, its opening draws push spring 16 on the door 15 away from armature 14. In this case when door 15 is reclosed, push spring 16 strikes armature 14 in passing, to produce the same result caused by energization of lock magnet solenoid 7.

While it is a relatively unimportant detail of the entire system, the door-controlling means has been described generally, for the reason that the opening of the door not only permits a message to be set up for transmission, but its closing in turn completes a preparatory circuit essential to the transmission of a message. For practical reasons in operation of the system it is important that the transmission of a message occur only when a transmitter has been isolated with its message set-up.

The set-up mechanism of the transmitter is operable when the door is open. The determining elements for the actual message to be transmitted comprise, in the form of transmitter illustrated in Figure I, three pairs of pulsing contacts 23, 24, and 25. The interruption of these contacts may be effected primarily by the action of suitable dials of a well known telephone type, which are set to the desired position, and which act under the influence of the releasable springs normally associated with such dials in telephone installations, to effect interruptions of the several contacts. Of the three pairs of pulsing contacts, the dials associated with contacts 23 and 25 should be so arranged that the number of interruptions effected by them upon release corresponds to the particular position in which they are initially set up by the person transmitting a message. The dial associated with contacts 24, on the contrary, is, for the particular use of the system hereinafter described, provided with interrupting elements so grouped and spaced that the release of the dial serves to effect a predetermined number of interruptions; or, as is herein specifically desired, two groupings of predetermined interruptions.

It should be understood that in each transmitting station, one transmitter, in the use of the system as herein specifically illustrated, serves to record the arrival of cars at a terminal point, while the other transmitter serves to record the departure of cars from that terminal point. Assuming, therefore, that the transmitter A' records the arrival of cars, the pulsing contact 24 associated with a dial bearing a fixed message may transmit code designating the transmitting station from which the message is sent, and that this particular transmitter, in this instance the transmitter A', is the one by which the arrival of cars at that station is registered. The group on the set dial, which designates the transmitting station, also produces in the accumulator of the system a selective functional effect, bringing into the system the appropriate member of the group of recording elements. The pulsing contacts 23 and 25, as shown, may each cause the transmission of a number from 1 to 10, so that the action of these two contacts may by operation of the dials associated with them, give the number of the train from which the operator is making a record of his arrival. Each number individually transmitted is herein termed a "digit" whether it comprises one figure or more than one figure. Pulsing contacts 23, 24 and 25 are disposed in a line 32 leading from discriminator B to ground 26.

Release of the interrupting dials to the action of their operating springs is effected by release magnets 20, 21, and 22, which are associated respectively with the dials acting upon the pulsing contacts 23, 24, and 25. In the circuit comprising release magnets 20, 21 and 22 are contacts 20a, 20b, and 20c associated with release magnet 20, contacts 21a, 21b, and 21c associated with release magnet 21, and contacts 22a, 22b, and 22c associated with release magnet 22. The normal, or idle, position of each contact group is with the movable contact b of each made with its associated c contact, that is the b—c contacts of each group are normally made.

The assembly associated with the contact pairs 23 and 25 being identical, the structure of both is shown by Figure If of the drawings in which reference number 25 designates the pair of pulsing contacts. 25a has thereon a nub 25b, which is deflected by a breaker cam 25c having thereon a pinion 25d meshing with dial gear 25e. During pulsing operation, breaker cam 25c deflects spring contact 25a a number of times depending on the length of arc through which gear 25e moves, and determined by the ratio between cam pinion 25d and dial gear 25e.

As explained elsewhere release magnet 22 is energized by the making of the 22 a—b contacts and the breaking of the 22 b—c contacts, to establish a circuit through the contacts. The idle position is one in which the 22 b—c contacts are made. Thus in idle position, extension 22f of plate 22g lies against stop 22h; and cam 22i bears against pin 22j on the spring contact 22b, thus separating the 22 a—b contacts. The latter features of the dial assembly perform the release circuit control functions of the assembly. Release magnet 22 has on its armature a blade 22k, which, within the dial casing, normally engages dial gear 25e to act as a detent. Upon energization of release magnet 22, movement of its armature 22l withdraws the detent to permit the dial to move angularly under the force of its associated spring, which has been wound in setting up the dial. For the sake of clearness the torsion spring 25f is not shown in Figure If of the drawings. It is connected with the shaft 25g, which carries dial gear 25e and on which plate 22g is fixed, and its position is shown in Figure Ie of the drawings, which is broken to illustrate the internal mechanism of the dial assembly.

Plate 22g carries a pawl 22m, which engages a ratchet 25h on dial gear 25e. Winding of torsion spring 25f by rotation of shaft 25g, therefore, does not move dial gear 25e, this gear being free on shaft 25g, and moving only under the influence of spring 25f following release.

This general structure is closely similar to that disclosed in Patent No. 512,400, issued to C. E. Scribner, January 9, 1894.

Desirably, but not necessarily, any governing assembly of well known form, may be applied to shaft 25g, to regulate the speed of the shaft under the influence of spring 25f.

The dial, or key, associated with pulsing contacts 24, is shown in Figures Id and Ig of the drawings, being shown in idle position in Figure Ig of the drawings, and Figure Id being broken away to show operating elements. The spring contact 24a of the pulsing contacts 24 has thereon a pin 24b, which bears against a spring 24c. When, therefore, spring 24c is deflected, it pushes spring contact 24a away from its associated contact of the pair.

The off-normal springs 21a, 21b, and 21c, corresponding to the 22a, 22b, and 22c springs described above, are under the control of cam 21d. In the inactive position shown, springs 21b and 21c are in contact, since pin 21e is on the high portion of cam 21d. When pin 21e rides onto the low portion of cam 21d, springs 21a and 21b come into contact, 21b and 21c being separated. As explained elsewhere, the 21 a—b contacts complete a circuit through the release magnet 21. Cam 21d is carried by the shaft 21j, carrying also bell crank 21g, which in its normal position engages the pin 21f of the dial 24d, which stops the dial 24d in its idle position.

Shaft 21j has connected therewith the torsion spring 24f, and is connected by gears 21m and 21n with the shaft 24g, which carries dial 24d. Gear 21m is free on shaft 21j, save for connection by a pawl 24h on the gear, and a ratchet 24i on the shaft 24j. Dial 24d is therefore not moved during winding of spring 24f, and moves only under force exerted by the spring upon release.

In tensing torsion spring 24f, bell crank 21g moves (clockwise in Figure Ig) away from stop pin 21f, and causes contact pin 21e to ride upon the low portion of cam 21d. By this action the 21 b—c contacts are broken and the 21 a—b contacts made, thus completing the release circuit through magnet 21. During this winding action, dial 24d, because of its ratchet connection, is not moved from its idle position.

In releasing action, release is here similarly effected by movement of the armature 21l of release magnet 21, upon energization of the magnet. Armature 21l carries an extension 21i, which engages a bell crank 21h. This second bell crank 21h also engages the stop pin 21f on dial 24d, and acts as a detent for the dial. Movement of armature 21l rotates bell crank 21h, and thus releases dial 24d. It will be understood that bell crank 21g has been rotated, so that it lies beyond the path of the pin 21f during clockwise rotation of the dial 24d.

When dial 24d has made a complete revolution, stop pin 21f on the dial again engages bell crank 21h to stop in idle position. Simultaneously shaft 21j, being rotated counterclockwise by torsion spring 24f, restores bell crank 21g to the position shown in Figure Ig.

Desirably, but not necessarily, any governing assembly of well known form may be applied to shaft 24g to regulate the speed of the shaft under the influence of spring 24f.

Dial 24d carries two sets of teeth 24e. In revolution of dial 24d, these teeth act on spring 24c, to force spring contact 24a away from its associated contact, and thereby pulse a message coded by the positioning of the teeth 24e.

The general detent arrangement, serving to withhold action of a transmitter and withdrawable to release an interrupting element to the motive power therefor, is disclosed in Patent No. 1,123,122, issued to J. J. Ghegan December 29, 1914, and Patent No. 1,280,097, issued to A. E. Stevens September 24, 1918.

The circuits controlling the action of the release magnets 20, 21, and 22 comprise a permanent circuit from trolley wire 1, by way of feeder line 1a, through a potentiometer resistance 17 to ground 29. This potentiometer acts effectively as a voltage divider, and the circuit is tapped at the potentiometer, and through a switch 18, to provide a constant source of current at low potential for the several local circuits. From switch 18 a conducting line 18a leads to door switch 19. The closing of the door 15 so affects switch 19 that a circuit is completed as far as the 22a contact of release magnet 22.

In order to illuminate the interior of the transmitter case, when its door is open, door switch 19 is desirably provided with 19a, 19b, and 19c contacts. The b—c contacts of door switch 19 are in the circuit referred to immediately above. When the door is open the a—b contacts of door switch 19 complete a branch circuit 15a leading to lamps 15b and 15c. Lamps 15b and 15c are shown as connected in series through line 35 to ground 36.

Conducting line 33 from the discriminator B connects directly with the release magnets 20, 21, and 22. Conducting line 34 from the discriminator connects with the movable 20b contact of release magnet 20. The action of the contacts associated with release magnets 20, 21, and 22 is such that in the transmission of a message each of these magnets in turn is brought into the circuit comprising the lines 33 and 34. In the physical installation of the transmitting dials there is suitable mechanical connection made between the dials and the movable contacts 20b, 21b, and 22b, so that the action of setting each dial opens the b—c contacts associated with the appropriate release magnet; that is, each dial acts on the contacts of the release magnet acting on that dial, and closes the a—b contacts of the release unit.

When door 15 of the transmitter is closed, with the dials of the pulsing contacts set up, a warning light shows that the transmitter is in condition for action, and must not be interfered with until its message has been delivered. This light comprises a lamp 27, connected in branch line 33a of line 33, resistance 28, and line 35, to ground 36. The lamp is illuminated, under the conditions stated, for the reason that the branch lamp circuit derives its current from the circuit 33, which is completed through contacts 22a and 22b, and through the contacts 19b and 19c. Accordingly, it is completed when the dial associated with pulsing contacts 25, the last dial to be operated, has been placed in set position to make the 22a—b contacts, and the door closed to make the 19b—c contacts.

Discriminator B, as said above, serves to make selection between the two transmitters A and A'. It also comprises a release control relay, operating in conjunction with accumulator relays, as hereinafter described, to complete the line 34 to ground 36, thus releasing the dials operating on the pulsing contacts 23, 24, and 25. The discriminating relays proper are relays 30 and 31. Relay 30 has associated with it the contact pairs 30a, 30b, and 30c; and the relay 31 has associated with it the contact pairs 31a, 31b and 31c. One element of each pair of contacts is movable, and the normally made contacts, in the idle position, are the a pairs and the b pairs of each set.

The normal position of the discriminator elements is the one shown in Figures I and Ib of the drawings. In this position line 32 terminates at the open 31c contacts; line 33 is completed through the 30a contacts to the solenoid of relay 31, to ground 36; line 34 passes by way of the 30b contacts and terminates at the open 37a contacts associated with release relay 37. Resistances 30d and 31d, and condensers 30e and 31e are desirably included, as shown, in the discriminator circuits in order to prevent arcing at the contacts.

The main line circuit of the system, 38, is connected with the solenoid of release relay 37, and terminates at the open 30c and 31c contacts.

*Description of selector arrangement and wiring*

The selector C comprises a motor 39 which revolves a double armed wiper 40 passing over a bank 41 of fixed contact points, shown as numbered from 1 to 10. Each of these contacts may be connected with a line leading to the discriminator of a transmitting station, the contact No. 10 being connected with the line 38 leading to the discriminator of the transmitting station shown in the drawings. Motor 39 receives its current through a local circuit 39a, deriving current from a suitable source, and completed through contacts 42a. Contacts 42a are controlled by relay 42, having its solenoid in line 65, and grounded at 42c. Wiper 40 is connected in the main circuit line 67.

The general operation of selector C is that, when solenoid 42 is energized, it holds contacts 42a made, to energize motor 39. Motor 39, when energized, constantly passes double armed wiper 40 over the bank 41 of fixed contacts leading to the several transmitting stations. This condition is normal; that is, the action of motor 39 continues at all times when no transmitting station is in condition to transmit a message. The action of the selector during the transmission of a message will be hereinafter described in connection with the action of the several elements of the system, in transmitting and accumulating a message, and in restoration of the parts in preparation for subsequent messages.

*Description of accumulator arrangement and wiring*

Message transmitting line 67, an earth return circuit, terminates at the 43a contacts of an accumulator relay 43. The control line 65 for the selector motor control terminates at the 44a contacts of an accumulator relay 44.

The accumulator, as shown, comprises a plurality of relays 43, 44, 45, 46, 47, 48, 49, 50, 51, 52, 53, 54, 55, and 56. Of these relays 52 is not only a circuit-controlling relay, but is also a stepping relay for multiple bank master switch 152. Relays 53, 54, 55, and 56 are not only circuit-controlling relays, but are also stepping relays for the multiple bank switches 153, 154, 155, and 156. The remaining accumulator relays are solely circuit-controlling relays, and of these relays, relay 46 is a pulsing relay, repeating the pulsations produced in a transmitter. Relay 51 is also of special structure and function, being a dash-pot relay and therefore slow to draw its armature, but quick in releasing.

Relays 46, 49, and 50 are quick release relays, while relays 43, 44, 45, 47, and 48 are slow release relays. Save for one specific relationship comparative resistance of the relay solenoids is of no definite operative importance in the system. The instance in which comparative resistance of the relays is of importance is in the relays 44 and 46, relay 44 having a high resistance solenoid, and relay 46 having a low resistance solenoid. The effect of this marginal resistance difference will appear hereinafter in the description of the functioning of the system.

Associated with slow release relay 43 are movable contacts 43a and a ground 78. Associated with slow release relay 44 are two movable contact pairs 44a and 44b, and a current source 66. Associated with slow release relay 45 is a set of contacts 45a, 45b, and 45c, contact member 45b being movable, and a ground 69. Associated with pulsing relay 46 is a set of contacts 46a, 46b, and 46c. The movable member 46b of this contact set has connection to a source of current 57. A current source 61 is connected with the solenoid of relay 46. Slow release relay 47 has associated therewith a set of contacts 47a, 47b, and 47c, the contact 47b being movable; and a movable contact pair 47d. The solenoid of relay 47 is grounded at 70. Slow release relay 48 has associated therewith a pair of movable contacts 48a, connected to current source 58, and a second pair of movable contacts 48b. The solenoid of relay 48 is grounded at 71. Quick release relay 49 has associated therewith a pair of movable contacts 49a, and a second pair of movable contacts 49b. This relay is grounded at 72. Quick release relay 50 has associated therewith a pair of movable contacts 50a, a pair of movable contacts 50b, a pair of movable contacts 50c, and a pair of movable contacts 50d. The fixed member of contact pair 50b is connected with a current source 59. This relay 50 is also grounded at 72. Dashpot relay 51 has associated therewith two pairs of movable contacts 51a and 51b, and is grounded at 68. The movable element of contacts 51b is connected with a current source 60.

With the system in normal condition for operation, but no message being transmitted, or preparation for transmission having been effected, as shown in Figure I, there is the following normal position of the contacts described immediately above. 43a contacts are made; 44a and 44b contacts are made; 45a—b contacts are made and 45b—c contacts are open; 46a—b contacts are open, and 46b—c contacts are made; 47a—b contacts are open; 47b—c contacts are made, and 47d contacts are made; 48a contacts and 48b contacts are both open; 49a contacts are made, and 49b contacts are open; 50a contacts are open; 50b contacts are open; 50c contacts are made; and 50d contacts are made; 51a contacts and 51b contacts are both open.

There is another source of current 63, through resistance 64 with its connection forked, so that one fork leads to the movable member of contacts 48b associated with relay 48, and the other leads through a plurality of mechanically operated contacts, to be more specifically described, to the movable member of 50a contact pair, and branches to the movable member of 51a contacts associated with dashpot relay 51. A further branch leads to the fixed member of contacts 48b associated with relay 48, to the contacts of bank 152a of master switch 152, and by way of relay 49 solenoid to ground 72.

Master relay 52 has associated therewith a movable contact pair 52r, and operates master switch 152, which comprises four banks 152a, 152b, 152c, and 152d. Each of these switch banks has a wiper 152a', 152b', 152c', and 152d', and each bank has a row of contacts $152a^2$, $152b^2$, $152c^2$, and $152d^2$.

As shown, the contacts of each bank are eleven in number, the wiper of each bank normally resting upon the No. 11 contact. In bank 152a all the contacts from 1 to 10 are bridged; in bank 152b none of the contacts are bridged, but there are connections with the No. 1 contact, the No. 2 contact, the No. 3 contact, and the No. 11 contact to the operating relays of switches 155, 156, 154, and 153. In switch bank 152c all the contacts from 1 to 10 are bridged. In switch bank 152d contacts from 4 to 10 are bridged, and wiper 152d' is connected with a current source 62.

It should be understood that the wipers of all the banks of master switch 152 step upon the release of relay 52 armature, suitable mechanical connections being made, so that release of the armature releases the switch to resilient means for producing the stepping. Such relay and switch structure, being well known, it is not herein mechanically illustrated.

Counting, or setting up, switch 153 comprises two banks, 153a and 153b, having associated therewith, respectively, wipers 153a' and 153b'. Each bank has a plurality of contacts, designated, respectively, $153a^2$ and $153b^2$, which are eleven in number. $153a^2$ contacts from 1 to 10 are bridged, and $153b^2$ contacts from 2 to 10 are each connected with a conductor in recorder cable 110. The wiper 153a' connects by way of contacts 53r with the switch-operating relay 53.

Counting switch 154 comprises two banks 154a and 154b, having wipers 154a' and 154b', respectively, and respectively comprising rows of contacts from 1 to 11, $154a^2$ and $154b^2$. Contacts $154a^2$ from 1 to 10 are bridged, and contacts $154b^2$ from 2 to 10 are connected with lines in recorder cable 111. Wiper 154a' is connected by way of contacts 54r with stepping relay 54. It may be here noted that all of these switches 153, 154, 155, and 156 step on the release of the armature of their respective relays, as does master switch 152 on release of master relay 52.

Counting switch 155 comprises two banks 155a and 155b, having, respectively, wipers 155a' and 155b', and contact points from 1 to 11, $155a^2$ and $155b^2$. In this bank, also, contacts $155a^2$ from 1 to 10 are bridged. In the row of contacts $155b^2$ of bank 155b the number 2 contact is connected with recorder line 112. Wiper 155a' of bank 155a connects by contacts 55r with operating relay 55.

Counting, and recorder control; switch 156 comprises three banks 156a, 156b and 156c. Bank 156a has wiper 156a' and a row of eleven contacts $156a^2$, the Nos. 1 to 10 contacts being bridged. Wiper 156a' connects by way of contacts 56r with operating relay 56. 156b bank of switch 156 has wiper 156b' and a row of contacts from 1 to 11, $156b^2$. The contacts $156b^2$ from 1 to 10 are each connected with a line in recorder cable 81. Bank 156c has a wiper 156c' connected with ground 91, and a row of contacts $156c^2$ from 1 to 11, the 1 to 10 contacts of the row being each connected with a line in recorder cable 90.

The normal position of all wipers in the several banks of these four counting switches is on the No. 11 contact of each bank. The contact rows of the a bank of each switch are interconnected by a conductor 113 which leads to bridged contact row $152c^2$ of bank 152c in master switch 152, and also leads to the 50b contacts associated with relay 50. The wipers of the b bank of each of the switches are connected by line 114 with contacts 50d associated with counting relay 50.

As above stated, current source 63 energizes a circuit completed through mechanical contacts associated with the switches. These bridging contacts 152e, 153e, 154e, 155e, and 156e are held open when the wipers of the switches with which they are severally associated are in normal position on the No. 11 contacts of their rows. It should be understood that these are spring contacts, and that all the wipers of the several banks of each switch are on a common shaft. A contact separating piece carried by the shaft may thus serve to hold the spring e contacts separated. When, therefore, the wiper of any switch is stepped from the No. 11 contact, the bridging contact associated with that switch is permitted to close, completing the circuit through that contact.

Associated with the switch circuits are a plurality of resistances and condensers, which are not given reference numerals. This is for the reason that they constitute merely a safety factor to prevent arcing of contacts, and perform no operative effect in the functioning of the system.

*Recorder arrangement and wiring*

A number of recording units are provided, one for each transmitting station. As shown in Figure I, however, one recording unit, that associated with the transmitter illustrated, is shown in the drawings. The recording unit comprises recorder elements of the door lock recorder type, a type such as illustrated and described in Letters Patent of the United States to J. W. Bryce, No. 1,417,715, dated May 30, 1922, and illustrated particularly in Figure XVI of the drawings of that patent. As illustrated, only the essential wiring connections of the recorder are shown, mechanical structure being illustrated diagrammatically or wholly omitted. While in the following description various mechanical elements which are not shown are described in connection with the recorder, this is merely for the purposes of illustration; since the recording instruments, as considered alone, form no part of the present invention, and are novel herein only in their relation to the accumulator of the system, in that the accumulator controls recorder operation, and is in turn controlled by the recorder operation. It is the fitting of the recorders to the accumulator and selector that is of interest herein.

The starting means for the recorder comprises a start relay 80, connected with that conductor 81a in cable 81 which is connected with the No. 1 contact of the row of contacts $156b^2$ on the b bank of switch 156. A circuit to start relay 80 is completed by way of conductor 80b to wire 82a in cable 82, to ground 83; the relay receives current from current source 62, connected with wiper 152d' on the d bank of master switch 152. After the closing of contacts 80a by energization of relay 80, a cam 86 on a single revolution shaft then holds closed a shunt connection 85a in the circuit of motor 84, by closing switch 85. Motor 84 may thus remain energized during the operation of switch 85, irrespective of the separation of contacts 80a.

Although not specifically so shown in the diagrammatic representation of the recorder, the shaft 87, upon which cam 86 is mounted, is driven by the motor 84 through a suitable magnet clutch operated by clutch magnets 87a. It is also to be understood that motor shaft 87 passes through commutator 88, and carries a plurality of bridging brushes, each of which co-operates with one of the various segment groups of the commutator.

In the recording assembly, the relation between commutator brushes and printing wheels (both not shown) is such that during the passage of any brush over the commutator segment group with which it is associated a printing wheel follows it. That is, when a brush, which is in co-operative relation to commutator segment group 88a, which is connected segment by segment with the wires of cable 111 leading from row of contacts 154b² on the b bank of switch 154, is in operative position with respect to a particularly numbered segment, the printing wheel associated with that brush operatively presents a printing digit corresponding to the digit representing the sequential position of the commutator segment of that group on which the brush lies. Another group of counting segments 88b is connected segment by segment with the wires of cable 110 leading to the row of contacts 153b² on the b bank of switch 153. An isolated segment 88c is connected by way of conductor line 112 with the No. 2 contact of row of contacts 155b² on the b bank of switch 155.

The positioning of printing wheels depends upon the energization of type magnets 89, these type magnets being connected by way of conductors 88a', 88b' and 88c' with the counting segment groups 88a and 88b and with the isolated segment 88c. The type magnets as a group are connected by way of line 90a in cable 90 with the No. 1 contact of the row of contacts 156c² on the c bank of switch 156.

The printing wheels are moved into position by suitable means, such as ratchets cam-operated from single revolution shaft 87, and each fixed to rotate with one of the printing wheels. During a single revolution of shaft 87, their connection to an energized segment of the commutator energizes each of the type magnets 89. Their energization causes each of the magnets respectively to act upon a pawl associated with it to enter it into a ratchet in the position defined by the contact of a brush with an energized segment associated with the magnet.

It will be understood that with two segment groups, and an isolated segment on the commutator, three brushes will be used, so that each group and the isolated segment may be completely passed over by a commutator brush during a portion only of each single revolution of shaft 87 on which the brushes are mounted. Shaft 87 also carries or has associated therewith a cam or cams for operating the printing hammers, such cam or cams being so positioned that they operate at such period during the single revolution of shaft 87 that the brushes carried by the shaft have previously passed over all commutator segments operatively associated with each brush. By means of a suitable tape and inked ribbon, such action serves to print the message which has been set up.

There is also a cam switch 94 associated with shaft 87, so that near the end of a single shaft revolution this switch may complete a circuit from battery 92, through cable conductor 93, tap 93a, tap 95a, and conductor 95 of cable 82. This circuit is branched, one branch connecting to ground 72 by way of the solenoid of relay 50, and the other branch leading to push button 94a.

It should be understood that the connections from cables 110 and 111 to the various segments of the commutator segment groups 88a and 88b are tap connections, the same cable wires serving other recording instruments associated with the same accumulator. The connection by line 112 from No. 2 contact of the row of contacts 156a² to isolated segment 88c is also a tap connection. This segment merely serves to limit movement of its associated printing wheel from its set position upon its energization. This single line continues on through all the recorders associated with the accumulator. It will be understood that the printing wheel, having its associated type magnet energized through segment 88c, may normally print a symbol representing the departure of a car, and may merely be limited in its movement by energization of segment 88c into a position effective to print a symbol designating the arrival of a car. Transmitter A', an arrival transmitter in this description, energizes segment 88c. Tap connections are also made to the conductors 82a, 93 and 95 in cable 82 which passes to the other recorders. As to cables 81 and 90, one wire of each cable is led therefrom for each recorder to complete the circuits for the start relay and type magnets, respectively.

Secondary clock movement 96, connected to a master clock, by conductors 96a, 96b and 96c in cable 97, serves to bring to printing position characters denoting time. Thus the time of each registration is printed simultaneously with the message.

*Brief description of drawings*

In the accompanying drawings Figure I, referred to above and comprising three sheets, Sheet 1, Sheet 2, and Sheet 3, illustrates the arrangement and wiring of a complete communication system set up in accordance with my invention, showing one transmitting station, the selector, the accumulator, and one recorder of the system;

Figure Ia is a diagrammatic representation, on an enlarged scale, of the transmitter door connections;

Figure Ib illustrates the discriminator relays and connections on an enlarged scale;

Figure Ic is a face view of the form of transmitter shown diagrammatically in Figure I;

Figure Id is a cross-sectional view, taken on the line Id—Id of Figure Ic, showing in side elevation the central transmitting element of the group forming the transmitter;

Figure Ie is a cross-sectional view, taken on the line Ie—Ie of Figure Ic, and showing in side elevation one of the end transmitting elements of the group;

Figure If is a cross-sectional view taken on the line If—If of Figure Ie, looking in the direction of the arrows;

Figure Ig is a cross-section view taken on the line Ig—Ig of Figure Id, looking in the direction of the arrows;

Figure II illustrates such relays and connections of the transmitter, selector and accumulator as are energized before a message has been set up on a transmitter, but with a transmitter door open and the system in condition to receive the message;

Figure III illustrates the relays and circuits which are energized and effective in a condition following that shown in Figure II, with a transmitter set-up, and the selector completing the electrical connection between the set-up transmitter and the accumulator, and with certain accumulator relays which have a mutual marginal effect, in the position immediately preceding such action as to initiate transmission of a message from the set-up transmitter;

Figure IV illustrates a marginal shifting in the effective accumulator relays from the position shown in Figure III, and shows the circuit effective in releasing one digit operating means of the transmitter. In this figure of the drawings the selector is omitted as its circuits are in the same condition as illustrated in Figure III;

Figure V illustrates active relays, circuits, and switch action in the accumulator in the interval between pulsations of the transmitter contact which is operative under interruption to produce line pulsations;

Figure VI is a diagrammatic representation of the entire system, illustrating the presence of a plurality of transmitting stations and their recorders;

Figure VII illustrates active circuits, relay action, and switch action in the accumulator in an interval between digits, with one digit transmitted and set up on the appropriate counting switch in the accumulator. In this figure of the drawings also, the selector is omitted, as its condition is unchanged from that existing in the system condition shown in Figures III and IV;

Figure VIII illustrates circuit and switch changes in the accumulator at the conclusion of an interval between the transmission of digits;

Figure IX illustrates a circuit, switch, and relay condition in the accumulator at the end of a complete message transmission, with the set-up on the accumulator switches complete, and with the recorder in operation. In this figure of the drawings the selector is shown as in the same condition as in Figures I and II, that is, with its wiper passing over contacts connected to the various transmitting stations to pick up any one of these stations in which a transmitter has been set up;

Figure X illustrates the condition in the recorder at the last stage of the recording operation, with release circuits to the accumulator completed through the recorder. This figure of the drawings illustrates the final action after the recording of a complete message and in preparation for a subsequent message.

Figure XI illustrates a final effect of the dashpot relay of the accumulator in its operation in effecting accumulator release following abnormal operation in the system.

Figure XII is a schematic diagram of the circuit in a modified form of transmitter;

Figure XIIa is a projected face view of the mechanical agents directly producing circuit interruptions and pulsations in this modified form of transmitter;

Figure XIIb is a plan view of this modified form of transmitter;

Figure XIIc is a fragmentary detail elevation of means for regulating the effect of coding dials in this modified form of transmitter;

Figure XIII is a schematic diagram of the circuit in a modified form of discriminator adapted to interconnection with another similar discriminator to accommodate four transmitters in a single transmitting station.

*System stage preparatory to setting up message for transmission*

This condition, illustrated in Figure II of the drawings, with reference to Figure I, and as therein described, is a condition in which a transmitter door has been opened to dial the message, but no message has yet been dialed. There is an energized circuit from trolley wire 1, by way of feeder line 1a through a potentiometer resistance 17 to ground 29. A circuit from the potentiometer resistance passes through switch 18, by way of conducting line 18a, to door switch 19. The transmitter door being open, the a—b contacts of door switch 19 are closed, completing a circuit 15a through lamps 15b and 15c, through line 35, to ground 36.

In the accumulator current passes from current source 57, through 46b—c contacts, 47b—c contacts, 49a contacts, and 44b contacts, through solenoid of relay 45, to ground 69. From the same current source, current passes through 46b—c contacts, the 47d contacts, the 44a contacts, by way of line 65, to selector relay 42 and ground 42c.

Selector relay 42 being energized, its armature is held to make contacts 42a to complete circuit 39a through motor 39. Motor 39 being operated, wiper 40 is being passed over the bank 41 of fixed contact points leading to the several transmitting stations.

In this state, the recorder is of course inoperative, and one transmitter of the transmitting station is merely being prepared for operation. The relay 45, which is a slow release relay, is performing merely the function of maintaining its contacts closed to complete a circuit through the solenoid of relay 44 from current source 66. The circuit through relay 44 includes line 67 to selector wiper 40, which is passing over contact bank 41. Since, however, at this stage of operation no ground has been prepared through any one of the contacts of bank 41, this circuit is merely preparatory.

*System stage in which transmitter is in condition to operate and selector has connected set-up transmitter to accumulator*

This is the stage having the circuits active at the instant illustrated in Figure III of the drawings. In the transmitter, door switch 19 has been operated, by the closing of the door, to break its a—b contacts and make its b—c contacts. A circuit is thus established by way of line 18a, from switch 18, through the 19b—c contacts to the 22a—b contacts, through conductor 33 to contacts 30a of discriminator relay 30, to the solenoid of discriminator relay 31, to ground 36. The a—b contacts associated with each release magnet had been made by the operation of dialing in setting up the transmitter.

There is another circuit from line 38, leading from No. 10 contact on contact bank 41 of the selector, to release relay 37 in the discriminator, through the 31c contacts, which has been closed by energization of relay 31, through line 32, by way of pulsing contacts 25, 24, and 23, to ground 26.

There is a branch circuit through warning lamp 27, by way of branch line 33a, of line 33, through the lamp, and by way of resistance 28, and line 35, to ground 36.

Wiper 40 of the selector, touching contact No. 10, a ground is established at 26 for the circuit from current source 66 through the solenoid of relay 44, contacts 45a—b, normally made 43a contacts, and line 67 to the selector wiper. The solenoid of relay 44 is a high resistance winding, and the current passing by the circuit, completed as thus described, is not sufficient to cause discriminator relay 37 to draw its armature.

The current passing by way of relay 44 solenoid is sufficient to cause relay 44 to draw its armature, breaking both its 44a and 44b contacts. By breaking the 44a contacts, the normally existing circuit through selector relay 42 to ground 42c is interrupted, thus releasing contact 42a in the motor circuit 39a, and deenergizing motor 39. Motor 39 being deenergized, wiper 40 remains on the No. 10 contact of bank 41. This is for the reason that the stopping time of motor 39 is less than the releasing time of relay 45, and the motor, therefore, comes to complete rest before relay 45 opens its a—b contacts and closes its b—c contacts. The action is, therefore, that contact of wiper 40 with a grounded contact point of contact bank 41 immediately establishes a ground for the circuit passing through relay 44 from current source 66, thus breaking the motor circuit, and allowing the wiper to remain at rest on the grounded contact.

If, however, the wiper should have but slight contact with this contact point grounded at a set-up transmitter and should slip past it, there is merely a return to the accumulator action as shown in Fig. II, with the 44a contacts made, and with relay 44 obviously not grounded. There is no other effect, and the transmitter set-up is not disturbed. This is for the reason that, as described, the current passing to discriminator relay 37 is not sufficient to cause it to draw its armature. It is further for the reason that relay 45 is slow to release upon the separation of 44b contacts, and accordingly does not release its armature to release its 45a—b contacts, which complete the circuit through relay 44, during the interval in which its circuit is interrupted. Wiper 40 therefore continues to rotate until it fully contacts, and comes to rest upon the grounded contact point of the selector, re-establishing the condition shown in Figure III. In this condition, as shown in Figure III, it should be understood that the circuit through 45 relay is interrupted, and that 45 relay is about to release its armature, to break the 45a—b contacts.

System stage of first digit transmission

This stage in the operation of the system is based on Figure I of the drawings and has the circuits active at the instant shown in Figure IV of the drawings. This stage immediately follows the stage shown in Figure III. As stated at the end of the description relating to the action illustrated in Figure III, relay 45 is deenergized; and although slow to release, is about to release its armature. In Figure IV the armature of relay 45 has been released, the 45a—b contacts have been broken, and the 45b—c contacts have been made. This change has cut high resistance relay 44 out of the circuit through the selector, and has introduced into the circuit current source 61, from which current passes through the low resistance winding of relay 46, 45b—c contacts, and the contacts 43a, to line 67.

The marginal current effect produced by the changing of high resistance winding of relay 44, for the low resistance winding of relay 46, permits current of sufficient value to pass to ground 26 by way of discriminator relay 37, to cause this relay to draw its armature. In drawing its armature, relay 37 makes contacts 37a associated with it, and completes a circuit to ground 36 through the 30b contacts of relay 30, conducting line 34, the made a—b contacts associated with release magnet 20, by way of the release magnet 20, and the made a—b contacts associated with the release magnet 22, through the b—c contacts of door switch 19, conducting line 18a, through switch 18 and potentiometer resistance 17, to the feeder line 1a leading from the trolley wire. By the establishment of this circuit, release magnet 20 is energized, and acts to release the set interrupting dial associated with pulsing contacts 23.

Each separation of the pulsing contacts 23, effected by dial action, interrupts the previously described circuit passing through the pulsing contacts to ground 26. This is the circuit which leads through the selector wiper 40 and line 67 to relay 46, and current source 61. Relay 46 which is a quick release relay, as well as a low resistance relay, thus releases its armature with each separation of the pulsing contacts 23. Relay 46 is thus a pulsing relay, repeating in the accumulator pulsations effected in an operating transmitter.

With each drawing of the armature of relay 46 a circuit is completed from current source 57, through the 46a—b contacts, by way of the solenoid of relay 47, to ground 70. By connection with this circuit, a circuit is also established from current source 57, the No. 11 contact of contact row 152a², and the wiper 152a' of a bank of master switch 152, to the solenoid of dashpot relay 51, to ground 68.

As a step following the condition shown in Fig. IV, and preparatory for the condition shown in Fig. V, relay 47 has pulled its armature to make its a—b contacts and break its b—c contacts and its d contacts. It should be understood that relay 47 is a slow release relay, which does not release its armature during the pulsating deenergizations of relay 46, attendant upon the interruption of its ground by separation of the pulsing contacts in the transmitter. That is, during the transmission of a complete digit, by one set of pulsing contacts, relay 47 holds its armature. By breaking its d contacts, relay 47 has also replaced relay 44 in holding open the circuit to selector relay 42, thus maintaining selector motor 39 in deenergized condition. It should be understood that relay 47 armature remains drawn through the transmission of an entire message, since between digit transmission relay 46 remains energized, holding its a—b contacts closed.

System condition during pulsations of digit transmission

This condition is the one, based on Figure I of the drawings, which has active at the instant of the separation of the active pulsing contacts, during digit transmission, the relays and circuits shown in Figure V of the drawings.

The pulsing relay 46 is drawing and releasing its armature in direct response to the making and breaking of pulsing contacts in the transmitter, as at present considered, these being contacts 23. Each release of relay 46, caused by separation of contacts 23, permits current to pass from battery 57, by way of the 46b—c contacts of relay 46, and by way of the a—b contacts of relay 47, to the solenoid of relay 48, to ground 71. Relay 48 holds its armature throughout the short intervals during which relay 46 is energized, to draw its armature, and break its b—c contacts, by the making of pulsing contacts 23 during the transmission of a digit. It does not release so slowly as to hold its armature during the relatively long interval between the transmission of digits, in which interval action is switched from one pair of pulsing contacts to another pair.

With each deenergization of pulsing relay 46, a circuit is made from current source 57, through the 46b—c contacts of relay 46, 47a—b contacts of relay 47, the normally made 50c contacts associated with relay 50, the wiper 152b; and No. 11 contact point on b bank of rotary master switch 152, to the solenoid of operating relay 53 associated with counting switch 153, to earth 74. Each drawing of the armature of relay 46 upon energization of this relay solenoid, by breaking the 46b—c contacts, breaks this circuit and deenergizes the solenoid of counting switch 153 to step the wipers 153a' and 153b', of the banks of this switch, the space of one contact from the idle No. 11 contact of each bank. This stepping is obviously effected upon release of relay 53 by means of the well known association of a tensioned element with the switch.

At the completion of the pulsation of relay 46, during the transmission of a digit, relay 46 remains energized, and relay 52 also energized. The final position of the wipers 153a' and 153b' is therefore upon that point of the row of contacts $153a^2$ and $153b^2$ which corresponds in sequence to the number of pulsations of relay 46 caused by deenergizations of relay 46 solenoid.

As noted, the pulsations of relay 46 do not cause release of relay 47 armature or of relay 48 armature. The initial release of relay 46 energizes the solenoid of relay 48 from current source 57, causing it to close its 48b contacts. This has established a circuit from current source 63, through the solenoid of relay 49 to ground 72. Energization of the solenoid of relay 48 also closes the 48a contacts, completing a circuit from current source 58, through the 48a contacts, to master relay 52, to ground 73 associated with the solenoid of master relay 52.

Since relay 47 is holding its armature, selector C remains in position with its wiper 40 on the No. 10 contact of bank 41 during the interruptions to ground 26 caused by separation of the pulsing contacts 23.

Figure V, illustrating more particularly the interval of separation of pulsing contacts 23, there is no circuit shown in this figure from pulsing relay 46, through the selector, to ground 26. The circuits in the active transmitter and in the discriminator therefore correspond substantially to those existing as shown in Figure III of the drawings. It, also, does not show the pulsing circuit, for the reason that the pulsing circuit is momentarily interrupted.

*System condition in initial stage between transmission of digits*

This condition is the one, based on Figure I of the drawings, which has active at the instant the circuits illustrated in Figure VII.

As shown, counting switch 153 has moved its wiper 153a' along the number of contact points $153a^2$ defined by the pulsations of relay 46, in response to the pulsations of contacts 23. Correspondingly wiper 153b' has been moved along a similar number of contacts. Switch 153 is thus at rest in the position defining the digit which has been transmitted. Relay 53 associated with switch 153 is out of circuit, since relay 46 remains in energized condition, with its a—b contacts made, and with its b—c contacts interrupted. Movement of switch 153 has permitted spring contacts 153e to close.

The interruption of the 46b—c contacts has also deenergized the solenoid of relay 48, which, however, at the instant illustrated in Figure VII, has not yet released its armature to interrupt the 48a contacts and the 48b contacts. Relay 52 associated with master switch 152, therefore, remains energized, since it still receives current from source 58 through 48a contacts. The solenoid of 47 relay also continues energized through the 46a—b contacts, from current source 57; and a circuit is completed from current source 57, through the No. 11 contact of the row of contacts $152a^2$, through the wiper of the a bank of master switch 152, to dashpot relay 51 and ground 68.

In the selector C, wiper 40 still remains on the No. 10 contact point of bank 41, the selector being omitted from the drawings as its position is unchanged. The discriminator set-up in the active transmitting station also remains unchanged.

In the transmitter, the completion of the series of pulses from pulsing contacts 23 has permitted the 20a—b contacts to be opened mechanically, and concurrently has permitted the 20b—c contacts to be closed. This is effected in well known manner, as is common in telephone dialing practice, by restoration of the dial associated with pulsing contacts 23 to its position of rest. The closing of the 20b—c contacts has completed the release circuit through the solenoid of release relay 21. This circuit passes by way of line 1a, potentiometer 17, conductor 18a, door switch 19b—c contacts, the 22a—b contacts, solenoid of relay 21, 21a—b contacts, 20b—c contacts, the conductor 34, the 30b contacts of discriminator relay 30, and the 37a contacts of relay 37, to ground 36.

Release relay 21, being energized, is about to release the telephone dial associated with pulsing contacts 24 to effect interruptions of the line circuit to ground 26.

*System condition in final stage between transmission of digits*

In this stage the circuits active at the instant are illustrated in Figure VIII, reference being had to Figure I of the drawings.

In this stage relay 48 is wholly out of circuit, having released both its a and its b contacts. Relay 52 has been deenergized by interruption of the 48a contacts, and has released master switch 152 to the action of tensioned means associated with it. This has stepped the wipers on all banks of switch 152 from the No. 11 contacts to the No. 1 contacts. Only the a bank of switch 152 is illustrated in Figure VIII, as it alone enters into the active operation. The movement of master switch 152 has permitted spring contacts 152e to close. As spring contacts 153e have already been closed by movement of counting switch 153, a circuit is established from current source 63, through resistance 64, and either of contacts 152e and 153e, by way of solenoid of relay 49, to ground 72. This circuit maintains relay 49 energized in spite of the interruption of the 48b contacts. There is a branch circuit through the No. 1 contact of the row of contacts $152a^2$ and the several bridged contacts on the a bank of switch 152, through the wiper 152a', to dashpot relay 51, and ground 68. This latter is also a holding circuit, to maintain dashpot relay 51 energized, since the circuit to the No. 11 contact on the a bank of switch 152 has been broken by movement of the wiper from the No. 11 contact.

Relays 46 and 47 remain energized, and the selector C, the discriminator B, and the transmitter A', remain in the same condition described in connection with Figure VII.

*Successive digit transmission*

It should be explained, that movement of the switch 152 has cut counting switch 153 out of circuit. Simultaneously by moving the wiper 152b' of its b bank to the No. 1 contact, it will be seen, by referring to Figure I of the drawings, that relay 55 associated with switch 155 has been potentially placed in circuit. Upon repetition of the previously described digit transmission, the circuit to relay 55 and ground 76 by way of the No. 1 contact of the 152b bank is completed, as is true of the completion of a circuit to relay 53 in digit transmission of the first digit, by way of 50c contacts, 47a—b contacts, and the 46b—c contacts to current source 57. The stepping of counting switch 155 thus proceeds in the manner that has been described for the stepping of counting switch 153, relay 55 releasing its armature upon drawing of the armature of relay 46 during the pulsations of digit transmission, until the cycle illustrated with respect to switch 153 in Figures V, VII and VIII of the drawings has been repeated with reference to switch 155.

Assuming that the second and third digits to be transmitted are set up on a common dial associated with pulsing contacts 24, one pair of pulsing contacts being shown in Figure I for second and third digit transmission, the arrangement of the dial face may be such that two fixed number groups of interruptions of the contacts are effected during restoration of the dial to a position of rest. A relatively great interval is also provided between the two fixed number groups of interruptions. At the end of the transmission of the second digit, therefore, there are stages between digit transmission such as are described in connection with Figures VII and VIII, save that between the second and third digits there is no action in the transmitter switching from one pair of pulsing contacts to another.

At the end of the transmission of the second digit, wiper 152b', on the b blank of master switch 152, steps to the No. 2 contact of that bank, establishing connection through the solenoid of operating relay 56, associated with counting switch 156, to ground 77. The circuit through relay 55 to ground 76 is interrupted by this movement, and relay 56 receives current by way of the connections to the wiper 152b', which have been previously described in connection with the establishment of a circuit to relay 55.

When the third digit has been transmitted, wiper 152b', upon deenergization of master relay 52, steps to the No. 3 contact point of bank contacts 152b², establishing a similar circuit through the solenoid of relay 54, associated with counting switch 154, to ground 75.

In the initial stage, accompanying this transfer, there is a shifting of activity in the transmitter from pulsing contacts 24 to pulsing contacts 25. Referring to Figures I and VII of the drawings, the 21a—b contacts, made in Figure VII, are interrupted, and the 21b—c contacts are made. This completes the circuit through release relay 22 instead of release relay 21, and serves to release the dial associated with pulsing contacts 25 to act on those contacts.

At the completion of digit transmissions, effected by interruptions of pulsing contacts 25, the entire message will have been set up on the counting switches of the accumulator, and the system will be in the position illustrated in Figure IX of the drawings.

*System condition immediately following last digit transmission*

This stage of the system is partially illustrated, as to the active circuits involved, in Figure IX of the drawings.

Following the final pulse of relay 46 under the influence of pulsing contacts 25, the 22a—b contacts are opened by restoration of the dial, associated with them and with pulsing contacts 25, to its position of rest. This opens the circuit from trolley line 1, through the transmitter A' to the solenoid of relay 31 in the discriminator. Relay 31, being slow to release, momentarily maintains the circuit to ground 26, through pulsing contacts 23, 24, and 25, line 32, contacts 31c, the solenoid of release relay 37, line 38, and line 67, from current source 61, through the solenoid of pulsing relay 46. The fact that the solenoid of relay 46 remains energized, breaks the circuit to relay 48 at the 46b—c contacts, and maintains these contacts open until a sufficient interval has elapsed for the retarded release of relay 48. In the manner previously described, the release of relay 48 deenergizes relay 52, causing it to drop its armature and release master switch 152 to the action of its tensioned stepping means.

Since each preceding digit transmission has stepped the wipers of switch 152 one point along the contacts of each of its banks, having been switched from contact point No. 11 to contact point No. 1 on the termination of the first series of pulses, and to the next successive point at the termination of each successive series of pulses, the wipers of each bank are now switched to contact point No. 4.

This switching of wipers 152a' and 152c' to the No. 4 contact point of the banks associated with them, produces no circuit changes. In the case of wiper 152b', however, it does pass the wiper from any contact point which serves to complete a circuit to the counting switches. In the case of the d bank of switch 152, movement of wiper 152d' to the No. 4 point, strapped to all succeeding contact points, establishes a circuit from current source 62, through wiper 152d' and the strapped contacts, through contacts 50d, to the wipers of the b banks on each of the switches 153, 154, 155, and 156.

A branch circuit is also established from current source 62 through the strapped 152d² contacts, through the solenoid of relay 43, to ground 78. The establishment of this circuit causes relay 43 to draw its armature, thus opening the 43a contacts associated with it, and breaking the 67 line circuit leading through the pulsing contacts to ground 26 in the transmitter. This action interrupts the circuit to ground 26 through the solenoids of accumulator relay 46 and discriminator release relay 37. At the completion of a slow release of discriminator relay 31, the discriminator B is also restored to its initial condition.

The solenoid of relay 46 being deenergized, relay 46 drops its armature, opening its 46a—b contacts, and thereby deenergizing the solenoid of relay 47. Due to the slow release of relay 47, current source 57 again supplies current by way of the 46b—c contacts, and the 47a—b contacts, to the solenoid of relay 48. The re-energization of relay 48 solenoid is merely incidental to the deenergization of relay 46, and although it is caused to close the 48a contacts to master relay 52, so that on release of relays 47 and 48 master switch 152 steps its wipers, this stepping has no functional effect for the reason that all succeeding points of the master switch banks have connections to circuits which are already set up.

Upon deenergization of pulsing relay 46, and relay 47, causing them to drop their armatures, current may pass from current source 57, by way of contacts 46b—c, 47d, and 44a, through line 65 to the solenoid of relay 42 and ground 42c. This causes relay 42 to draw its armature, closing motor circuit 39a at contacts 42a, and energizing motor 39 to again rotate the selector wiper 40. Selector C is thus again active to perform its selecting functions when the succeeding elements of the system have been cleared for action.

Since wiper 152d' of master switch 152 is on the No. 4 contact of contact points 152d² in the d bank of the switch, current may pass from current source 62 through wiper 152d', the strapped No. 4 to No. 10 of $d$ bank contacts of switch 152, by way of the 50$d$ contacts associated with relay 50, the No. 1 contact of the row of contacts 156$b^2$ associated with counting switch 156, and by wire 81$a$ in cable 81 to the start relay 80 of that recorder E which is shown in the drawings, and through the solenoid of start relay 80, and by way of tap connection 80$b$, to line 82$a$ and ground 83.

It will be noted by reference to Figure I of the drawings, that the $b$ bank of switch 156 selects the recording instrument which is associated with the particular transmitting station which has been in action. In the present instance the wiper of this bank is on the No. 1 contact, thereby selecting the recorder shown in the drawings. This means that the transmitter dial, associated with pulsing contacts 24, has its operating face arranged to transmit one pulse for the purpose of connecting that transmitting station with its associated recorder. The energization of start relay 80, causing it to draw its armature, closes contacts 80$a$, completing local recorder circuit 84$a$ to the recorder commutator motor 84. After it is once closed, circuit 84$a$ is controlled by contacts 85, irrespective of the passage of current through relay 80. This is for the reason that a cam 86 (shown in Figure I) is mounted on the single revolution commutator shaft 87, and as revolution of this shaft begins, cam 86 acts to close contacts 85, completing circuit 84$a$ through the branch connection 85$a$.

As was described in the descriptive portion of the specification, commutator 88 comprises segment groups 88$a$ and 88$b$, together with an isolated segment 88$c$, and commutator shaft 87 carries three brushes so arranged that one of the three brushes passes over contact 88$c$, and the two others respectively pass completely over segment groups 88$a$ and 88$b$ during less than a single revolution of shaft 87. When, therefore, one of these brushes in its travel contacts the segment 88$c$, which is connected with the No. 2 contact on the row of contacts 155$b^2$ of switch 155, current can pass through the appropriate member of the type magnets 89 associated with this segment. It will be noted that on the $b$ bank of switch 155 the No. 1 contact is blank, this contact representing the normal, or set, position of the type wheel associated with the type magnet connected with segment 88$c$. Commutator segment 88$c$ may be a single segment, in that it merely acts to determine shifting from normal type wheel position to an alternative position. This reflects in the recorder the use of either of the transmitters A or A′ in a transmitting station, and is a communication defined in each transmitting station on the dial associated with pulsing contacts 24.

It should be understood that, in a recorder of this type, type wheels are suitably connected to be moved in accordance with movement of the commutator shaft, and are halted by energization of the type magnet with which each type wheel is associated. In the present example, referring to segment 88$c$, the type wheel is therefore merely controlled in its movement, for example, to assume either the position indicating the operation of an "arrival" transmitter or the position indicating the operation of a "departure" transmitter, and is stopped in printing position by its associated type magnet.

Similarly the various segments of segment group 88$a$, being connected by tap connections with the several wires of cable 111 leading to the contact points on the $b$ bank of switch 154, that segment of the group is placed in circuit which is connected to the active contact point of the $b$ bank of switch 154. Similarly, by tap connections to the several wires of cable 110, that segment of segment group 88$b$ which is connected to the contact point in the $b$ bank of switch 153 on which wiper 153$b'$ rests is placed in circuit.

When the brush associated with each of these groups reaches the energized segment, the appropriate type magnets are therefore energized to check rotation of the type wheels in the proper position to print the set-up character. In the $b$ banks of switches 154 and 153, also, the No. 1 contact point is not connected to a commutator segment. This is for the reason that in this instance, also, there is one character which is printed by complete normal travel of the type wheel from its position of rest. If there is no energized segment therefore in contact 88$c$, or either of the groups 88$a$ and 88$b$, the type wheel associated with them may rotate to a positive limit, thus bringing it into position to print a normal character; that is a character mechanically set initially, and afterward unaffected by positive electrical selection.

It should be understood that the wipers 153$b'$, 154$b'$, 155$b'$, and 156$b'$, on the $b$ bank of each of the counting switches, all receive current from source 62 (the same current source from which start relay 80 receives its current) through bank 152$d$ of switch 152, contacts 50$d$, and the line 114 connected with each of the wipers.

During the conclusion of a single revolution of shaft 87, printing hammers are operated by suitable mechanical connection to the shaft to effect printing of the characters for which type wheels have been positioned.

All of the type magnets 89 have been grounded at 91, by way of wiper 156$c'$ associated with the $c$ bank of switch 156. Switch 156 thus places the start relay of the selected recorder of a recorder group in circuit, by means of its $b$ bank; and by means of its $c$ contact bank, provides a ground for the type magnets 89 of that selected recorder.

We will assume that at the conclusion of the stage illustrated in Figure IX, printing has been completed, but neither the recorder nor the accumulator has been restored to normal condition.

*System stage involving the normal restoration of recorder and accumulator to idle condition.*

This system stage, in which the recorder and accumulator are cleared out, amongst other action effects, involves the energization of the circuits shown in Figure X of the drawings.

As to the accumulator, the action is initiated by the energization of clearing out relay 50. In the recorder a cam switch 94, which is cam operated from commutator shaft 87, is closed after the printing operation has been completed. The closing of cam switch 94 completes a circuit from current source 92, through conducting line 93, tap connections 93$a$ and 95$a$, to conducting line 95, the solenoid of clearing out relay 50, to ground 72 in the accumulator.

In the accumulator, relay 50, drawing its armature, breaks contacts 50$c$ and 50$d$, thereby interrupting the circuit from current source 62 to the several wipers on the $b$ banks of all the counting switches. Simultaneously, relay 50 closes its $b$ contacts, thereby completing a circuit from current source 59 to the $c$ contact bank of master switch 152, and by way of wiper 152$c'$, and contacts 52$r$, associated with master relay 52, to ground 73. There is a branch circuit through the strapped contacts of the *a* bank in each of the counting switches, and by way of the wipers of each of these banks, through the *r* contacts associated with each of the counting switch relays 53, 54, 55, and 56 respectively, to grounds 74, 75, 76, and 77.

As relay 50 draws its armature, it closes the 50*a* contacts to provide a "stick" circuit from battery 63 and resistance 64, by way of the mechanically operated contacts 152*e*, 153*e*, 154*e*, 155*e*, and 156*c*, to the solenoid of relay 50. Under this condition, relay 50 will not become deenergized to release its armature until all of these *e* spring contacts are mechanically opened by return of all of the switches to their starting position.

Master relay 52, being energized through its contact 52*r*, draws its armature, breaking these contacts and causing the master switch 152 to step. The action is a "buzzer" action, the master relay 52 becoming reenergized by dropping its armature to make contacts 52*r*, and breaking these contacts by the energization thereby produced. A similar action occurs in each of the counting switches 153, 154, 155, and 156, and relays 53, 54, 55, and 56 are respectively being energized with the making of the *r* contacts of each, and stepping upon interruption of these contacts. Each step moves the wipers on all banks of the counting switches nearer to the No. 11 contact points. As the wipers 153*a*, 154*a*, 155*a*, and 156*a*, on the *a* bank of each of the counting switches leaves the No. 10 point of that bank and contacts the No. 11 point of the *a* bank, the circuit to each of the counting relay solenoids 53, 54, 55, and 56 from battery 59 is opened, and the counting relays come to rest in this position with the wipers of all banks on the No. 11 contacts. As above stated, in this position of rest the 153*e*, 154*e*, 155*e*, and 156*e* contact springs are mechanically opened. Similarly the contact springs 152*e* of master switch 152 are mechanically opened when master switch 152 resumes its idle position. As soon as the last switch reaches this position, the "stick" circuit to relay 50 solenoid is broken, and this relay releases its armature.

During the entire period of the reception of the pulses from a transmitting station, relay 49 has held its armature, its solenoid being energized by current from battery 63, passing by way of one or another of the *e* contact springs, associated with the master switch and the counting switches. Relay 49, like relay 50, releases on the opening of the last of the *e* spring contacts, permitting its 49*a* contacts to close. The closing of the 49*a* contacts completes a circuit from battery 57, contacts 46*b*—*c*, contacts 47*b*—*c*, contacts 49*a*, contacts 44*b* to the solenoid of relay 45 and ground 69. Relay 45, drawing its armature, closes contacts 45*a*—*b*.

Simultaneously with the release of relay 49 and relay 50, relay 43 is deenergized, since it derives its holding current through a circuit from battery 62, the strapped Nos. 4–10 contacts on the row of contacts 152*d*$^2$ of master switch 152, or from battery 57 through contacts 49*b*, 47*b*—*c*, and 46*b*—*c*. With the release of relay 43 the accumulator circuit is again in condition to receive a communication from any transmitting station.

It should be understood that Figure X of the drawings illustrates the initial stage of the action above outlined, while the final condition of the accumulator is that illustrated in Figure II of the drawings. Certain of the accumulator relays therefore do not appear in Figure X, since their action is intermediate between the initial condition of the stage and the final condition.

*Action of dashpot relay in clearing system of abnormal conditions such as those caused by accidental grounding*

Dashpot relay 51 has been previously described in the description of the system elements, and has also been described as energized during the accumulator action following the selection of a set-up transmitter. The action of the dashpot which retards movement of the relay 51 armature upon energization of its solenoid may be varied, by varying the stroke of the dashpot piston. As set, however, for the system elements shown and described, the retardation of armature movement is such that a complete message will have been transmitted and recorded before dashpot relay 51, after its energization, has acted to make its contacts 51*a* and 51*b*. That is, the solenoid of dashpot 51 is deenergized before movement of its armature has any effect in the system.

We will assume, however, that there has been an accidental grounding in the system lying outwardly of the accumulator, as for example a ground in one of the lines 38 leading from a transmitting station to the selector C.

In this case, accumulator action proceeds as if a message were being transmitted, as far as the circuit position of the accumulator shown in Figure IV, the selector wiper 40 being also stopped upon the contact point connected with the grounded transmitter line. To briefly describe this action with relation to the accumulator: relay 46, drawing its armature, a circuit is completed from battery 57, through contacts 46*a*—*b*, the No. 11 contact on the *a* bank of switch 152, wiper 152*a'* of this master switch bank, to the solenoid of dashpot 51 and ground 68.

Referring now to Figure I of the drawings for the parts affected by energization of dashpot relay 51, the following action may be traced. At the completion of the delayed movement of relay 51 armature, the associated contacts 51*a* and 51*b* are made. The closing of 51*a* contacts produces no effect, since these contacts are connected in the circuit of the *e* contacts of all the switches. These *e* contacts are, as above noted, in mechanically separated condition because all of the switches are in their normal position. Contacts 51*b*, however, in closing, initiate a train of action which eventuates in a clearing out of the system similar to that effected after the normal transmission and recording of a communication.

Still referring to Figure I of the drawings, contacts 51*b*, in closing, complete a circuit from current source 60 to the solenoid of relay 43 and ground 78. Since the establishment of the accidental ground has produced the identical initial action in the accumulator which occurs when a set-up transmitter has been "picked up" by the selector, current source 61 has now energized the solenoid of relay 46, and a circuit is completed from current source 61 through the relay 46 solenoid, the 45*b*—*c* contacts, and the 43*a* contacts, to the grounded point. The energization of the solenoid of relay 43 by the circuit previously described, causes it to draw its armature and open the 43*a* contacts. This is the first opening of the circuit from the accumulator to the ground since its establishment, and the interruption of the 43*a* contacts causes deenergization of relay 46 solenoid.

Release of relay 46, upon deenergization of relay 46 solenoid, opens the associated contacts 46*a*—*b*, and closes the contacts 46b—c. By reference to Figure I of the drawings, it will be seen that this action deenergizes relay 47 and energizes relay 48; relay 47, however, holding its armature momentarily due to the fact that it is a slow release relay. The opening of the 46a—b contacts also breaks the circuit, shown in Figure IV of the drawings, to the solenoid of dashpot relay 51. Dashpot relay 51 thus releases, opening both the 51a and 51b contacts. The 51b contacts, being in the circuit from current source 60 to relay 43 solenoid, their interruption causes relay 43 to be deenergized. Since relay 43 is a slow release relay, its momentarily continues to hold its armature and thereby hold contacts 43a open.

Meanwhile the making of 46b—c contacts has made a circuit from battery 57 through the 46b—c contacts, and the 47a—b contacts, to the solenoid of relay 48 and ground 71; and also a branch circuit has been made to the counting relay 53 solenoid and ground 54 by way of the 50c contacts, and the No. 11 contact on the b bank of master switch 152. Relay 48, and relay 53 associated with counting switch 153, being both energized, draw their armatures. The energization of counting switch relay 53 does not in itself effect any changes, since the switch steps upon deenergization of the relay. The drawing of relay 48 armature, however, closes the 48a and the 48b contacts associated with that relay.

The making of the contacts 48a completes a circuit from current source 58 to the solenoid of master relay 52, and ground 73, causing master relay 52 also to draw its armature. The making of contacts 48b completes a circuit from current source 63, by way of resistance 64 and the contacts 48b, to the solenoid of relay 49 and ground 72, causing relay 49 to draw its armature, closing contacts 49b, and opening contacts 49a. The accumulator condition as illustrated in Figure V of the drawings has thus been artificially established.

During the train of relay action above described, it should be understood that relay 43 and relay 47, although deenergized, had not released their armatures. Relay 47 now releases its armature, which opens the 47a—b contacts and closes the 47b—c and the 47d contacts. It will be remembered that the 47d contacts control the connection to relay 42 in selector C, which controls the motor circuit of the selector. The closing of the 47d contacts thus frees the selector, which may act to pass its wiper 40 over contact bank 41.

Opening of the 47a—b contacts breaks the circuit to relay 48, which, however, holds its armature momentarily; and also breaks the circuit to counting switch relay 53, causing switch 153 to step the wipers 153a' and 153b' on its a and b banks from the No. 11 contact points to the No. 1 contact points. As switch 153 steps, it permits the 153e spring contacts to close, thus completing a circuit from current source 63 and resistance 64, through the 153e contacts, to the solenoid of relay 49 and ground 72. When, therefore, the parallel circuit from the same current source to relay 49, by way of the 48b contacts, is broken, relay 49 remains energized.

A further effect of the release of the relay 47 armature is the establishment of a circuit from current source 57, by way of contacts 46b—c, contacts 47b—c, contacts 49b, and the solenoid of relay 43, to ground 78, thus reenergizing relay 43 before it releases its armature. Relay 43 thus remains effective to hold open the contacts 43a, maintaining the accumulator during this action free from further effect of the accidental ground.

At this point in the action, relay 48, having been slow to release, releases its armature, and opens the 48a contacts and the 48b contacts. The opening of the 48b contacts has no effect in the accumulator condition, since a by-pass circuit paralleling the circuit through the 48b contacts has been established, this parallel circuit being the one completed through the spring contacts 153e. The 48a contacts opening, however, break the circuit from current source 58, by way of contacts 48a, to the solenoid of master relay 52 and ground 73, causing master switch 152 to step, and move the wipers of all its banks from the No. 11 contact points to the No. 1 contact points; simultaneously movement of switch 152 permits spring contacts 152e to close.

Referring to Figure VIII of the drawings, the circuits through the switches and to dashpot relay 51 are now as shown in that figure of the drawings, a circuit having been established to dashpot relay 51 by movement of master switch wiper 152a' to the No. 1 contact of the row of contacts $152a^2$. The relay condition is different from that as shown in Figure VIII of the drawings, however, in that relay 43 is energized, and the relays 46 and 47 are deenergized. Insofar as the switch action in the accumulator is concerned, the condition is as if a single pulse message, constituting the first digit of a communication, had been received.

In describing the normal operation of the accumulator during the reception of the complete message, it has been stated that the dashpot relay 51 remains energized during the whole period of message transmission and recording, but that it is ineffective to close its contacts, because the time required to complete the reception and recording is less than the period of dashpot operation.

We are here describing the condition in which the establishment of an accidental ground has caused dashpot relay 51 to introduce an artificial pulse into the system. If a partial message had been received, the following action cycle would be similar, although the wipers of the master switch might have been stepped further and one or more of the counting switches might have been stepped further in accordance with the pulsations of the partial message. When a partial message is transmitted, an artificial pulse produced by relay 51 would be unnecessary, and the effect of the dashpot relay would therefore occur in the following manner, common to both abnormal conditions.

Considering both instances of accidental ground, and partial message transmission, master relay 52 has operated to step the wipers on all banks of master switch 152 to contact points other than the No. 11 contact points. Without further pulsing to complete the message, these wipers, and the wipers of any of the counting switches that may have been stepped, would remain in the position to which they have been stepped. In this condition, however, with the wiper 152a' of master switch 152 upon one of the Nos. 1 to 10 strapped contact points of the bank $152a^2$, a circuit exists from current source 63, through the resistance 64, the e spring contacts of all switches which have been moved from the normal, the $152a^2$ contacts and wiper 152a', to the solenoid of dashpot relay 51 and ground 68. At the end of the piston stroke in the dashpot associated with relay 51 armature, the armature of relay 51 is drawn to close the contacts 51a and 51b. The closing of contacts 51b has no effect, since both contact springs are at the same potential, one being connected to current source 60 and the other to current source 57. The closing of the 51a contacts, however, completes a circuit to clearing out relay 50 and ground 72 from current source 63, by way of resistance 64, the made e contacts, and contacts 51a. The solenoid of relay 50, being energized, draws its armature.

This is the circuit condition shown in Figure XI of the drawings, and with the energization of relay 50 solenoid, the restoration of the accumulator circuits to normal is identical with the same action occurring upon the energization of relay 50 solenoid following the recording of a complete message.

The action of dashpot relay 51 in clearing the system of accidentally created conditions is automatic. If, however, it is desired to test the system, and an operative condition has thereby been set up, and should be cleared out, the same effect may be obtained by a manual operation producing an energization of relay 50 solenoid. This manual operation is effected by means of push button 94a, operation of which places the solenoid of relay 50 in communication with current source 59.

The function of dashpot relay is of importance, although its action occurs infrequently because of defective functioning of the elements of the system. I have found that in use of the system, however, operators not well acquainted with the operation of dial setting at the transmitting stations quite frequently operate a transmitter improperly. This causes the reception of a partial message, and it is highly desirable that the accumulator be restored to normal condition. The action of the dashpot relay thus automatically "short-cuts" the action which occurs in normal operation when a complete, properly dialed, message has been received and recorded.

*General discussion*

It will be seen from the foregoing, that the selector of the system may be, and is in practice, connected to a number of transmitting stations, which according to their individual "setting-up" are placed in the line circuit to a central station. From the selector to the single accumulator at the central station there are but two wires, of which wire 67 is the line wire, and wire 65 is the selector control wire. There is at the central station a single accumulator, comprising selectively acting relays and switches. This accumulator functions between a number of transmitting stations and a similar number of associated recorders.

It may, therefore, be said that the selector and the accumulator arrangement obviates the necessity of a transmitting line from each individual transmitting station to its appropriate recorder. As a group of transmitting stations may be relatively close to each other, and associated with a single selector by wires of inconsiderable length, and since the group of stations, together with their selector, may be located at a great distance from the single station at which recording takes place, it will be seen that a great saving in the installation and maintenance of wires is obtained by this arrangement, requiring only a single line wire, and a single selector control wire, from the central station to the selector.

The accumulator, considered in conjunction with the selector, performs a duel function. One function, which would be necessary, even if individual lines were run from each transmitting station to a recorder, is the general function of setting-up the transmitted code on elements arranged to selectively affect the recorder, together with the function of placing the recorder in action. The accumulator of my system, however, performs the additional general function of controlling the selector, and of selecting the appropriate recorder to be placed in action by the active transmitting station "picked up" by the selector. The accumulator and the selector thus co-operate in reducing the number of line wires necessary for the transmission of messages from a number of transmitting stations.

The system, as illustrated and described, is arranged with ten transmitting stations. Without rearrangement of either major or minor elements, it might be made adaptable to a greater number of transmitting stations by merely increasing the capacity of the selector, and the capacity of the accumulator switches and the number of conductors leading from them to an increased number of recorders. As previously explained, the number of digits which may be transmitted (the system being adapted as shown and described for the transmission and recording of four digits), may be increased without substantial change in the accumulator. This can be effected by a mere addition to the number of counting switches and their associated relays, and by an increased number of segment groups in the commutator of each recorder. There would be necessary a change in the master switch, shown, only if the system were to be adapted for the recording of more than ten digits. The group of control relays, that is relays 43 to 50 inclusive, and the dashpot relay 51, would not require any change in adapting the system to an increased number of digits.

To consider my system analytically, the transmitter A or A' used is one of a number of possible variants having primarily the quality of release from a central station, through the selector and discriminator by accumulator control. Because of its controlled release, each transmitter is further capable of storing the message "set-up" on it during intervening release and action of one or more other transmitters.

My discriminator B, in addition to its function of discriminating between two transmitters of a transmitting station, has another primary function, in the action of transmitter release relay 37, of completing a ground to release a "set-up" transmitter under the marginal action of high and low resistance relays 44 and 46 in the accumulator.

As to the selector C, its primary quality of interest herein lies in its control by the accumulator, with relation to the marginal accumulator effect upon transmitter release relay 37 in the discriminator, and in that its selecting actuation and its positive halting are under accurate accumulator control.

The accumulator D is the control element of my system, operating automatically in conjunction with the other elements. In addition to the accumulator functions as generally stated above, it has the effect on the selector and discriminator relay 37 which has been specifically noted. The pulsing, or repeating, relay of the control group is so interrelated with the other elements of this group that it co-operates in the general selecting operation of stepping and releasing the master switch and the counting switches. In the counting operation, the various functions are performed by the co-operation of a relatively small number of relays. These relays by stepping the various switches, and even more specifically in clearing them at the appropriate stage of operation, permit the use of the same switches to control the recording of a plurality of digits, from a number of transmitting stations, on a number of appropriate recording clocks.
As to the recorders E, the primary function, in which each recorder may affect the entire system, is in the energization of the "clearing out" relay in the accumulator, after the record has been made; which energization, by accumulator action, places the accumulator, selector, and the discriminator in condition for the reception of a subsequent message.

An additional accumulator feature resides in the action of dashpot relay 51, this relay acting as a substitute for a satisfied recorder, in initiating the "clearing out" action of the accumulator, and the restoration of the selector and discriminator to normal receptive condition.

It should be understood that the selector and accumulator of the system may, without substantial change, be used with appropriate transmitters and recorders to perform their function in controlling the transmission and recording of information of various sorts. The recording, as controlled by the selector and accumulator, may be either the total result of a message transmitted, or may be a correlated function making record of the transmission of a message. For example, if it is desired to record, at a central office, business transactions taking place at a number of outlying stations, the transmitter dial arrangement may be such as to transmit appropriate coding, and the recording instruments may take the form of adding machines rather than time clocks. In such instance, necessarily, special connections placing the adding machines under accumulator control must be supplied; but the selector and accumulator in their arrangement and function may be substantially as shown and described herein.

*Modified form of transmitter*

As explained in the general discussion above, the primary system function of the transmitter is that it be released to transmission under accumulator and selector control, and that it store its message pending release. It was also explained that various forms of transmitter having this characteristic in the system, and being capable of imposing on the line codes variable at will, as well as fixed codes, might be employed. A modified form of transmitter, having these characteristics, is illustrated in Figures XII, XIIa, XIIb, and XIIc of the drawings.

Referring to Figures XII to XIIc inclusive, contact springs 105 and 106 are connected by suitable mechanical gearing, hereinafter described, to indicating dials, so that manually setting the desired number on each dial causes contact springs 105 or 106 to move in advance of pulsing spring 104 the space of one insert tooth for each successive change in the dial indication. With the dials each set at zero, contact springs 105 and 106 are in the same position relative to their coding wheels 108 and 109 respectively that pulsing spring 104 maintains relative to its coding wheel 107. Contact springs 105 and 106 by their position determine the variable digits of the message, and their position, with respect to pulsing contacts 104, is limited, as hereinafter described at one end of their arcs to the position at zero reading, described above, and at the other end of their arcs to positions nine insert teeth in advance of the zero position, as shown in dotted lines, Figure XIIa.

Coding wheels 107, 108, and 109 revolve with shaft 121, completing one revolution each time the transmitting mechanism becomes active in the line circuit of the system in transmission. Removable interrupting inserts 120 are positioned at the sockets between teeth in the coding wheels 107, 108, and 109. In passing under the pulsing contacts 104, and spring contacts 105 and 106, respectively, these interrupting members interrupt the electrical contacts, and thereby the circuits of which these springs are a part. In Figure XIIa the dotted lines indicate the position of contact springs 105 and 106 at the limit of their advance settings.

Referring now to Figure XII, the coding wheels 107, 108, and 109 are shown as straight line developments of their circumferences, with inserts 120 so positioned that the dials may be set to produce messages identical with those produced by transmitter A' for similar settings of the dials.

Off-normal springs 103a, b and c are mutually in electrical contact only in the fully set condition of the transmitter, mutual contact being made by cam action. Upon release of the transmitter, interruption of all of these contacts is permitted.
Off-normal springs 102 are open in both the idle position, and in the fully set position of the transmitter. An arm acting on these springs 102 causes them to close their contacts following the release of the transmitter, and to open them just before the transmitter again comes to the idle position. The arm acting on springs 102 causes them to close a circuit around contacts 103b—c, before the latter are permitted to separate following transmitter release.

The mechanical elements of the transmitter comprise a tensioned spiral spring 121a, carried by shaft 103f, which also carries a ratchet 121e. Gear 121d carrying pawl 121f is free on shaft 103f. This gear 121d drives gear 121c, which is fixed on shaft 121. Shaft 121 is driven from shaft 103f by the pawl and ratchet engagement of gear 121d with the shaft 103f.

Shaft 121 also carries gear 121b which has a projection 101c. In inset position of the transmitter, extension 101c on gear 121b engages extension 101b of the armature 101a of release magnet 101, to prevent rotation of shaft 121 beyond its idle position. When spring 121a is wound, by manually turning shaft 103f, shaft 121 does not rotate, because of the engagement of the extension 101c on gear 121b with the extension 102b on arm 102a, which is supported by a fixed pin 102c. Shaft 121 is permitted to remain idle because of the pawl and ratchet engagement between shaft 103f and gear 121d.

Rotation of shaft 121 in a direction of rotation which would be produced by rotation of shaft 103f under unwinding action of spring 121a, is prevented by the same mechanical means which prevent rotation of shaft 121 beyond its idle position.

Contacts 102 are held separated by the deflection of spring 102e, caused by the pressure of the arm 102a upon the nub 102d, on spring 102e (Figure XII), arm 102a being in engagement with the extension 101c on gear 121b by means of its own extension 102b.

The cam action causing the closing of off-normal springs 103a, b and c will now be described.
Shaft 103f carries cam 103e. Spring 103c has thereon nub 103b, which rides the face of cam 103e. In the idle position of the transmitter nub 103d rests upon the lobe portion of cam 103e. In the fully set position of the transmitter nub 103b rests upon the high portion of cam 103e, thereby causing mutual contact of the contact springs 103a, b and c.

The foregoing describes the means, and operation, effective in setting the transmitter.

With the tensioning of spring 121a to effect rotation of shaft 121, the off-normal springs 103a, b and c have been brought into mutual contact, the transmitter is prepared for transmission, pending establishment of releasing circuits in the discriminator hereinbefore described as an element of the complete system. Upon selection of the set transmitter, for transmission, release magnet 101 is energized by circuits prepared through off-normal contacts 103 a—b and the discriminator circuits previously described, and draws its armature 101a, disengaging extension 101b from the extension 101c on gear 121b.

Upon disengagement of the extension 101b from extension 101c, shaft 121, and shaft 103f are free to rotate under the impelling force of tensioned spring 103a. Shaft 121, carrying gear 121b, in rotating disengages extension 101c from extension 102b, allowing the arm 102a to swing free from the spring 102e, thereby making contacts 102. Shaft 103f, carrying cam 103e, in rotating permits contacts 103, a b and c to open.

Shaft 121, carrying coding wheels 107, 108, and 109, rotates them under the contact springs 104, 105, and 106 respectively, and, as the removable interrupting inserts 120 pass under the springs, the springs are caused to open and close. The opening and closing of these springs generates line pulsations which give the transmitted message. The manner of selecting the variable components of the code will be hereinafter described.

As the shaft 121 completes one revolution, the extension 101c on gear 121b again engages the extension 101b on the armature of magnet 101 to stop rotation in the normal idle position of the transmitter. The armature 101a of magnet 101 has been released magnetically upon the opening of the 103 a—b contacts. Simultaneously, extension 101c on gear 121b engages the extension 102b on arm 102a, so that the shaft 121 is prevented from backward rotation, and pressure on arm 102a again opens the contacts 102.

By suitable gearing, appropriate governor mechanism of any well known sort may desirably, but not necessarily, be applied to 121.

Pulsing springs 104 are in the circuit between line 32 and ground 126, and serve to interrupt this circuit to produce the same pulsing as contacts 23, 24, and 25 in transmitter A', shown in the preceding figures of the drawings. Contact springs 105 and 106 are connected in series, and in a circuit shunting the pulsing contacts 104. If both contact springs 105 and 106 are closed, the pulsing contacts 104 will be shunted by a closed circuit to ground 126, and therefore interruptions of contacts 104 will have no effect in the line circuit to relay 46.

As previously stated, contacts 104, by being opened and closed as removable interrupting inserts 120 are rotated with coding wheel 107, cause line interruptions. Referring particularly to Figure XIIa, the interrupting inserts 120 are grouped on the periphery of code wheel 107 to form four series of line interruptions. In rotation of code wheel 107 counterclockwise the insert groups given the specific references 107a and 107b are the groups involved in transmitting the variable portions of a message.

Variation in the number of impulses in the variable groups is determined by the setting of contacts 105 and 106 with respect to insert groups 108a and 109b, respectively, before rotation of shaft 121 begins.

Spring 104a of contacts 104 is preferably shaped to enter the intervals between insert teeth 120. Contact springs 105a and 106a are preferably shaped to ride the outer faces of the inserts, without entering the intervals therebetween. Contacts 104 will open and close in response to the rise and fall of spring 104a under the deflecting action of inserts 120. Contacts 105 and 106 open under the influence of the first insert 120 of group 108a and group 109b respectively as they contact springs 105a and 106a respectively, and remain open until the last insert of the respective groups has contacted the springs.

The electrical connections of this modified transmitter, other than this functioning specifically in coding and pulsing, are similar to corresponding elements associated with transmitter A', and bear the same reference numerals. Their description and function is included in the description of that transmitter.

As the coding wheels rotate counterclockwise, and the first interrupting insert 120 of coding wheel 107, Figure XII, engages the pulsing spring 104 to open the contacts, coding wheel 108 has rotated so that contact springs 105 are in engagement with the last insert on this wheel. Disengagement of both springs from these inserts occurs almost simultaneously. In this specific exemplary position, the digit set-up consists of a single interruption of the line circuit.

With contact springs 105 closed for the remainder of the transmission, and contact springs 106 not yet opened by engagement with the first interrupting insert on coding wheel 109, the shunt circuit around pulsing springs 104 is complete, and further interruptions will not become effective until the shunt is again opened.

By reference to Figure XIIa of the drawings it will be seen that the inserts on coding wheel 109 are so placed that they bridge two contact groups on wheel 107, which may represent the fixed coding; and also bridge another group representing one of the variable codings. They are, however, so arranged that they do not interfere with the group of interrupting inserts on coding wheel 108. Referring then also to Figure XII, contact springs 106 will be held open, breaking the shunt circuit, during the action of the two groups of inserts on wheel 107 which represent the fixed codings. The positioning of contacts 106, with respect to coding wheel 109 then determines, throughout the action, how many inserts of the fourth group on coding wheel 107 may be effective before the shunt circuit is re-established. The position of contacts 106 as shown in Figure XII, and in dotted lines in Figure XIIa, is such that these springs will be held open only for a single circuit interruption of springs 104 caused by the fourth (or second variable) group of inserts on coding wheel 107.

Contact springs 102 maintain a circuit to the warning lamp 27 during transmitting action of the transmitter. Contact springs 103b—c maintain a circuit to warning lamp 27 during the period between the "setting-up" of the transmitter and its release. The contacts 103a—b prepare a circuit to the release magnet 101 pending transmitter release, as by action of discriminator relay 37. Referring to Figures XIIb and XIIc of the drawings, the contacts 106 are mounted on the arm 106b of the gear segment 106c, which rotates freely on shaft 121. Gear segment 106c is in mesh with a rack 106d, and a gear 106e on shaft 106f is likewise in mesh with rack 106d. Shaft 106f carries dial 106j and plate 106g.

Plate 106g is slotted in its periphery, and carries positive stop 106l. Idler wheel 106h rides the periphery of plate 106g, maintaining pressure thereon by means of the spring 106i; and, by means of the idler wheel 106h and the slots on plate 106g, shaft 106f is held in any set position. The positive stop 106l, on plate 106g, co-operating with positive stop 106k on the frame of the transmitter, limits the movement of shaft 106f in setting to one revolution. Dial 106j has on its face characters denoting the second variable digit to be transmitted, or that digit transmitted by the group 107b of insert 120 on coding wheel 107.

As dial 106j is set for any desired digit, or character, the shaft 106f is rotated; and, by means of the rack 106d, in mesh with the gear 106e on shaft 106f, and the gear segment 106c rotating freely on shaft 121, the contacts 106 are revolved about coding wheel 109 into position to short circuit the pulsations of spring 104 beyond those required in the transmission of a selected digit.

Dial 105j similarly offers selection of the first variable, or that digit transmitted by the insert group 107a on wheel 107. It does this by connection with rack 105d comprising elements identical with those described immediately above as associated with dial 106j. Also the connections between rack 105d and contact 105 are identical with the connections between rack 106d and contacts 106.

With this modified form of transmitter the required spacing between digit pulsing is obtained by a relatively wide spacing between the several groups of inserts 120 on wheel 107, as shown in the drawings.

*Modified form of discriminator*

The modified form of discriminator, illustrated schematically in Figure XIII of the drawings, is designed for interrelation with another similar discriminator for the control of two pairs of transmitters in a transmitting station.

This modified form of discriminator comprises a discriminating selector relay 129, having two solenoids 130 and 131, differentially connected with respect to each other. The discriminator illustrated in Figure XIII is generally similar to the discriminator B described in the preceding figures of the drawings, and has the solenoids 130 and 131 of relay 129 connected in parallel respectively, with the solenoids of discriminating relays 30 and 31 of such discriminator. Relay 129 has associated with it two contact pairs: one contact pair 129a being normally made, and the other, contact pair 129b, being normally open.

I have installed this modified form of transmitter in my system at locations where two street railway lines terminate. At such locations, the modified discriminator permits any one of the four transmitters, indicating arrival and departure of cars in the two lines, to be placed in a single line earth return circuit to the selector of the system, and to the central office.

It should be understood that one of my modified forms of discriminator is used in connection with each pair of transmitters, and that the two discriminators are interconnected. The interconnection between the discriminators is shown as by lines 132, 133 and 138. Together with the double solenoid relay 129 these lines constitute an interlock between the two transmitter pairs, whereby one pair of transmitters is, as a group, withheld from the line circuit during the operation of either transmitter of the other pair.

Having but one discriminator of modified form shown in Figure XIII of the drawings, it should be understood that interconnecting lines 132 and 133 are connected in the discriminator which is not shown oppositely to their connection as shown. That is, in the discriminator not shown, line 133 is connected to the solenoids of its corresponding relay, and line 132 connects to the a contacts associated with the corresponding relay of the discriminator not shown. Line 138 is a branch of line 38 to the selector, and in the discriminator which is not shown it passes by way of 129b contacts to relay 37, similarly to the connection of the line 38 in the discriminator shown.

Contact 129a normally maintains the circuit through line 133 to ground 36. Contact 129b, which is normally open, is in the main line circuit 38 to the discriminator. With two pairs of transmitters connected to the line 38 leading to the selector, the operation of each pair is identical with the operation in the system of a transmitting station as previously described, the mutual discrimination of one pair of transmitters, by the co-operative action of the two discriminators, serving to delay the functions of the other pair.

As transmitter A' is set up, and the relay 31 draws its armature, the parallel circuit through solenoid 131 of relay 129, and line 132, to ground, energizes relay 129 and causes it to draw its armature. With contact 129a now opened, the circuits through the relay (not shown), corresponding, in the other discriminator, to relay 129, cannot be energized, since their connection to ground 36 is broken. With contact 129b closed, the circuit from the selector C, through line 38 to relay 37, is closed; and the pair of transmitters, which have been positively withheld from action, will become active when further selection is accomplished at the selector C.

In withholding from operation the relay of the other discriminator corresponding to relay 129 (shown), a ground connection for relay 129 is maintained for at least the duration of operation of transmitter A', and the pair which does not comprise the initially active transmitter is withheld from line 38 by means of the open contacts in the branch line 138.

The modified discriminator as above described may be used with either form of transmitter herein illustrated and described, or with any similarly operating form of transmitter.

I claim as my invention:

1. In an electric signaling system the combination of a plurality of transmitters, each transmitter comprising tension operable circuit interrupting means for effecting line pulsations and electrically withdrawable detaining means for said circuit interrupting means, whereby the transmitters are capable of being placed in condition to effect line pulsations and capable of maintaining such condition pending establishment of a circuit individually therethrough, a central control and receiving station for all transmitters, a movable selector switch having selective connection to each transmitter individually, a single line circuit from said selector switch to said control and receiving station, a control circuit from said station to said selector switch controlling movement of said selector switch, current source and current control means in said station effective instantaneously upon operative connection of said selector switch with a transmitter which is in condition for transmission to prevent movement of said selector switch and maintain said transmitter operatively in circuit with the control and receiving station by way of said single line circuit, means in said central control and receiving station responsive to line pulsations originating at a transmitter connected thereto by the selector switch, stepping means in said station electrically connected with and operable by said pulsation responsive means, and indicating means operably connected with said stepping means.

2. In an electric signaling system the combination of a plurality of transmitters, each transmitter comprising tension operable circuit interrupting means for effecting line pulsations and electrically withdrawable detaining means for said circuit interrupting means, whereby the transmitters are capable of being placed in condition to effect line pulsations and capable of maintaining such condition pending establishment of a circuit individually therethrough, a central control and receiving station for all the transmitters, a movable selector switch constituting a transmitter selecting station remote from the central control and receiving station having selective connection to each transmitter individually, a single line circuit from said selector switch to said control and receiving station, a control circuit from said station to said selector switch controlling movement of said selecting switch, current sources and current control means in said station effective instantaneously upon operative connection of said selector switch with a transmitter which is in condition for transmission to prevent movement of said selector switch and maintain said transmitter operatively in circuit with the control and receiving station by way of said single line circuit, electrical transmitter release elements co-operatively active in effecting transmitter release and responsive only to predetermined current conditions in the line circuit, current controlling means comprising relays of differential solenoid resistance in the central station acting initially to impose on the line circuit current conditions to which said transmitter release elements are unresponsive and by sequential action acting to impose on the line circuit current conditions to which the transmitter release elements are responsive, means in said central control and receiving station responsive to line pulsations originating at a transmitter connected thereto by the selector switch, stepping means in said station electrically connected with and operable by said pulsation responsive means, and indicating means operably connected with said stepping means.

3. In an electric signaling system the combination of a plurality of transmitters, each transmitter comprising tension operable circuit interrupting means for effecting line pulsations and electrically withdrawable detaining means for said circuit interrupting means, whereby the transmitters are capable of being placed in condition to effect line pulsations and capable of maintaining such condition pending establishment of a circuit individually therethrough, a central control and receiving station for all transmitters, a movable selector switch having selective connection to each transmitter individually, a single line circuit from said selector switch to said control and receiving station, a control circuit from said station to said selector switch controlling movement of said selector switch, current sources and current control means in said central station effective instantaneously upon operative connection of said selector switch with a transmitter which is in condition for transmission to prevent movement of said selector switch and maintain said transmitter operatively in circuit with the control and receiving station by way of the single line circuit from said selector, a transmitter release magnet associated with each transmitter, and a relay functionally related to a transmitter which is in circuit and responsive only to predetermined current conditions in the line circuit to act effectively in completing a circuit to the transmitter release magnet, said current control means in the central station comprising differential resistance elements serving initially to impose on the line circuit through the selector current conditions to which said release relay is unresponsive and by sequential action acting to impose on the line circuit current conditions to which the transmitter release relay is responsive, means in said central control and receiving station responsive to line pulsations originating at a transmitter connected thereto by the selector switch, stepping means in said station electrically connected with and operable by said pulsation responsive means, and indicating means operably connected with said stepping means.

4. In an electric signaling and recording system the combination of a central receiving and control station, a transmitting station selector switch remote from said central receiving and control station, a plurality of transmitting stations individually connected for selection to said selector switch; a plurality of printing recorders, a plurality of interrelated relays and multicontact switches, and a plurality of current sources and interconnections thereto comprised in said central receiving and control station, one of said relays being a pulsing relay; a line circuit from the selector switch to the central receiving and control station said relays operable under influence of said current sources upon selective completion of the line circuit through an active transmitting station by way of the selector switch to place said pulsing relay in circuit with the transmitting station through which a circuit has been completed and to establish operative relation between said pulsing relay and said multicontact switches; current-operable means associated with each of said printing recorders and capable of initiating action thereof, connection from the current-operable means of all the recorders to one of the multicontact switches organized as a recorder selector and operable under the influence of said pulsing relay, whereby one of the printing recorders is selectively set in action by the effect of the pulsing relay on the switch with which the starting means of the recorders are connected, and connection from all the recorders to the other multicontact switches, whereby an actuated recorder is rendered responsive to pulsations of said pulsing relay.

5. In an electric signaling and recording system the combination with a central station of a remote selector switch, a line circuit from said central station to said selector switch, a control circuit from said central station to said selector switch, said selector switch having movement controlled by said control circuit; said central station comprising control relays controlling said selector by way of said control circuit, a plurality of printing recorders and a receiving and control assembly comprising a plurality of interrelated relays and multicontact switches, and a plurality of current sources and interconnections thereto, one of said relays being a pulsing relay; a plurality of pulsation sources each having its individual recorder selecting code for line pulsations and having means therein for effecting message pulsations in the line, said pulsation sources electrically connected to the selector for selective inclusion in the line circuit to the central control and receiving station; said relays operable under influence of said current sources upon completion of the said line circuit to a source of pulsation by way of the selector switch to place said pulsing relay in circuit with the selector switch and to establish operative relation between said pulsing relay and said multicontact switches; current-operable means associated with each of said printing recorders and capable of initiating action thereof, connection from the current-operable means of all the recorders to one of the multicontact switches organized as a recorder selector and operable under the influence of said pulsing relay, whereby one of the printing recorders is selectively set in action by the effect of the pulsing relay on the switch with which the starting means of the recorders are connected; and connection from all the recorders to the other multicontact switches, whereby an actuated recorder is rendered responsive to pulsations of said pulsing relay.

6. In an electric signaling and recording system the combination of a central receiving and control station, a selector switch, a line circuit from said selector switch to said central receiving and control station, a plurality of transmitting stations individually connected for selection to said selector switch; the transmitting stations each comprising at least one transmitter having an electrically releasable dial coded to produce recorder selecting line pulsations and at least one electrically releasable dial variably adjustable to initiate a message by line pulsations; a plurality of printing recorders, a plurality of interrelated relays and multicontact switches, and a plurality of current sources and interconnections thereto comprised in said central receiving and control station, one of said relays being a pulsing relay; said relays operable under influence of said current sources upon completion of a circuit through a transmitting station by way of the selector switch to place said pulsing relay in circuit with the transmitting station through which a circuit has been completed and to establish operative relation between said pulsing relay and said multicontact switches; current-operable means associated with each of said printing recorders and capable of initiating action thereof, connection from the current-operable means of all the recorders to one of the multicontact switches which is operable under the influence of said pulsing relay, whereby one of the printing recorders is selectively set in action by the effect of the pulsing relay on the switch with which the starting means of the recorders are connected, and electrical printing control connections from each of the recorders to other multicontact switches movable in accordance with pulsations of said pulsing relay.

7. In an electric signaling and recording system the combination with a central station of a remote selector switch, a line circuit from said central station to said selector switch, a control circuit from said central station to said selector switch, said selector switch having movement controlled by said control circuit; said central station comprising control relays controlling said selector by way of said control circuit, a plurality of printing recorders and receiving and control assembly comprising a plurality of interrelated relays and multicontact switches, and a plurality of current sources and interconnections thereto, one of said relays being a pulsing relay; a plurality of pulsation sources each having its individual recorder selecting code for line pulsations and having means therein for effecting message pulsations in the line, said pulsation sources electrically connected to the selector for selective inclusion in the line circuit to the central control and receiving station; said relays operable under influence of said current sources upon completion of the said line circuit by way of the selector switch to place said pulsing relay in circuit with the selector switch and to establish operative relation between said pulsing relay and said multicontact switches, current-operable means associated with each of said printing recorders and capable of initiating action thereof, connection from the current-operable means of all the recorders to one of the multicontact switches organized as a recorder selector and operable under the influence of said pulsing relay, whereby one of the printing recorders is selectively set in action by the effect of the pulsing relay on the switch with which the starting means of the recorders are connected, electrical printing control connections from each of the recorders to other multicontact switches movable in accordance with pulsations of said pulsing relay, whereby an actuated recorder is rendered responsive to pulsations of said pulsing relay.

8. In an electric signaling and recording system the combination of a central receiving and control station, a selector switch, a plurality of transmitting stations individually connected for selection to said selector switch, the transmitting stations each comprising at least one transmitter having an electrically releasable dial coded to produce recorder selecting line pulsations and at least one electrically releasable dial variably adjustable to release message by line pulsations; a selector control circuit to the central receiving and control station, selector control relays organized to control movement of said selector by way of said selector control circuit, a plurality of printing recorders, a plurality of interrelated relays and multicontact switches, and a plurality of current sources and interconnections thereto comprised in said central receiving and control station, one of said relays being a pulsing relay; said relays operable under influence of said current sources upon completion of a circuit through a transmitting station by way of the selector switch to place said pulsing relay in circuit with the transmitting station through which a circuit has been completed and to establish operative relation between said pulsing relay and said multicontact switches; current-operable means associated with each of said printing recorders and capable of initiating action thereof, connection from the current-operable means of all the recorders to one of the multicontact switches organized as a recorder selector and operable under the influence of said pulsing relay, whereby one of the printing recorders is selectively set in action by the effect of the pulsing relay on the switch with which the starting means of the recorders are connected, electrical printing control connections from each of the recorders to other multicontact switches movable in accordance with pulsations of said pulsing relay, whereby a recorder is selected by pulsations initiated in a transmitting station selected by the selector switch, and a message is recorded in the selected recorder in accordance with pulsations initiated in said appropriate transmitting station; means in each recorder operable in an active recorder of the system to establish connection to one of said relays upon completion of recorder printing action to initiate action of said interrelated relays and multicontact switches restoring the system to normal condition after action of the recorder selected for action in accordance with pulsations of said pulsing relay.

9. In an electric signaling system the combination of a plurality of transmitting stations each comprising more than one transmitter and each transmitter comprising tension operable circuit interrupting means for effecting line pulsations and electrically withdrawable detaining means for said circuit interrupting means whereby the transmitters are capable of being placed in condition to effect line pulsations and capable of maintaining such condition pending establishment of a circuit individually therethrough, a normally moving selector switch, connection from each transmitting station to the selector switch, said connections comprising contacts and contact controlling relays acting to complete the connection to the selector switch from a transmitter of the station placed in condition to effect line pulsations and positively to retain interrupted connection to other transmitters of the station pending changed action of said contacts and contact controlling relays upon complete transmitting action of said conditioned transmitter, a central control and receiving station having a single line connection to said selector switch, means in said central control and receiving station responsive to line pulsations originating at a transmitter connected thereto by the selector switch, progressively movable means in said station electrically connected with and controlled by said pulsation responsive means, and indicating means operably connected with said progressively movable means.

10. The combination of claim 4 in combination with a relay in the central station organized by connection with the assembly of multicontact switches and relays and electrical connections therebetween to institute clearing action restoring the system to normal condition upon completion of a circuit to said clearing relay by an active recorder, contact means in each recorder organized to complete the circuit to said clearing relay, and a movable member in each recorder timed with recording action to act upon said contact means to complete the circuit to said clearing relay in the terminal period of recorder action.

11. The combination of claim 5 in combination with a relay in the central station organized by connection with the assembly of multicontact switches and relays and electrical connections therebetween to institute clearing action restoring the system to normal condition upon completion of a circuit to said clearing relay by an active recorder, contact means in each recorder organized to complete the circuit to said clearing relay, and a movable member in each recorder timed with recording action to act upon said contact means to complete the circuit to said clearing relay in the terminal period of recorder action.

12. The combination of claim 6 in combination with a relay in the central station organized by connection with the assembly of multicontact switches and relays and electrical connections therebetween to institute clearing action restoring the system to normal condition upon completion of a circuit to said clearing relay by an active recorder, contact means in each recorder organized to complete the circuit to said clearing relay, and a movable member in each recorder timed with recording action to act upon said contact means to complete the circuit to said clearing relay in the terminal period of recorder action.

13. In an electric signaling system the combination of a plurality of transmitting stations each having more than one transmitter comprising circuit interrupting means and actuating means therefor and electrically withdrawable detaining means for said circuit interrupting means whereby the transmitters are capable of maintaining set condition pending establishment of a line circuit individually therethrough, a transmitting station selector, individual connection from each transmitting station to said station selector, said connections comprising contacts and contact controlling relays acting to complete the connection to the station selector from a transmitter of the station placed in condition to effect line pulsations and positively to retain interrupted the connection to other transmitters of the station pending changed action of said contacts and contact controlling relays upon complete transmitting action of said conditioned transmitter, a central control and receiving station having a line connection consisting in a single circuit to said transmitting station selector, counting means in the central control and receiving station, means in said central control and receiving station responsive in action to line pulsations originating at a transmitter connected thereto through the station selector, and connection between said counting means and said pulsation responsive means for progressive actuation of the counting means to a condition coordinate with the action of said pulsation responsive means.

14. In an electric signaling system the combination of a plurality of transmitters each comprising circuit interrupting means and actuating means therefor and electrically withdrawable detaining means for said circuit interrupting means whereby the transmitters are capable of being placed in condition to effect line pulsations and capable of maintaining such condition pending establishment of a circuit individually therethrough, a central control and receiving station for all transmitters, a transmitter selector having selective connection to each transmitter individually, a line connection consisting of a single circuit between said transmitter selector and said central control and receiving station, a control circuit from said central station to said transmitter selector, current source and current control means in said station effective instantaneously upon operative connection of said transmitter selector with a transmitter which is in condition for transmission to prevent further positive action of said selector and maintain said transmitter operatively in circuit with the control and receiving station by way of said line circuit, counting means in said central control and receiving station, means in said central control and receiving station responsive in action to line pulsations originating at a transmitter connected with said station by way of the transmitter selector, and connection between said counting means and said pulsation responsive means for progressive actuation of the counting means to a condition coordinate with the action of said pulsation responsive means.

15. In an electric signaling system the combination of a plurality of transmitters each comprising circuit interrupting means and actuating means therefor and electrically withdrawable detaining means for said circuit interrupting means whereby the transmitters are capable of being placed in condition to effect line pulsations and capable of maintaining such condition pending establishment of a circuit individually therethrough, a central control and receiving station for all transmitters, a transmitter selector having selective connection to each transmitter individually, a line connection consisting of a single circuit between said transmitter selector and said central control and receiving station, electrically responsive means associated with each transmitter for effecting withdrawal of the transmitter detaining means, control means in said central station effective by way of said transmitter selector to a selected transmitter to cause action in said electrically responsive means eventuating in transmitter release, counting means in the central control and receiving station, means in said central control and receiving station responsive in action to line pulsations originating at a transmitter connected with said station by way of the transmitter selector, and connection between said counting means and said pulsation responsive means for progressive actuation of the counting means to a condition coordinate with the action of said pulsation responsive means.

16. In an electric signaling system the combination of a plurality of transmitters each comprising circuit interrupting means and actuating means therefor and electrically withdrawable detaining means for said circuit interrupting means whereby the transmitters are capable of being placed in condition to effect line pulsations and capable of maintaining such condition pending establishment of a circuit individually therethrough, a central control and receiving station for all the transmitters, a transmitter selector remote from the central control and receiving station, a line connection consisting of a single circuit between said transmitter selector and said central control and receiving station, a control circuit from said central station to said transmitter selector controlling action of said selector, current source and current control means in said central station effective instantaneously upon operative connection of a transmitter which is in condition for transmission with said central station by way of said transmitter selector to prevent action of said selector and maintain said transmitter operatively in circuit with the central station, electrical connections to the withdrawable transmitter detaining means cooperatively active in effecting transmitter release and responsive only to predetermined current conditions in the line circuit, current controlling means in the central station comprising relays of differential solenoid resistance acting initially to impose on the line circuit current conditions to which the transmitter control elements are unresponsive and by sequential action to impose on the line circuit current conditions to which the transmitter release elements are responsive, counting means in said central control and receiving station, means in said central control and receiving station responsive in action to line pulsations originating at a transmitter connected with said central station by way of the transmitter selector, and connection between said counting means and said pulsation responsive means for progressive actuation of the counting means to a condition coordinate with the action of said pulsation responsive means.

17. In an electric signaling system the combination of a plurality of transmitters each comprising circuit interrupting means and actuating means therefor and electrically withdrawable detaining means for said circuit interrupting means whereby the transmitters are capable of being placed in condition to effect line pulsations and capable of maintaining such condition pending establishment of a circuit individually therethrough, a central control and receiving station for all transmitters, a transmitter selector having selective connection to each transmitter individually, a line connection consisting of a single circuit between said transmitter selector and said central control and receiving station, a control circuit from said central station to said transmitter selector controlling action of said selector, current sources and current control means associated with the line circuit effective instantaneously upon operative connection in said transmitter selector with a transmitter which is in condition for transmission to prevent action of said selector and maintain said transmitter operatively in circuit with the central station by way of said selector, a transmitter release magnet associated with each transmitter, each transmitter being functionally related to a release control relay effective when the transmitter is in condition to effect circuit interruptions, the said release control relay being responsive only to predetermined current conditions in the line circuit to act effectively in completing a circuit to the transmitter release magnet, said current control means associated with the line circuit comprising differential resistance elements serving initially to impose on the line circuit current conditions to which said release relay is unresponsive and by sequential action to impose on the line circuit conditions to which the transmitter release relay is responsive, counting means in said central control and receiving station, means in said central control and receiving station responsive in action to line pulsations originating at a transmitter connected with said central station by way of the transmitter selector, and connection between said counting means and said pulsation responsive means for progressive actuation of the counting means to a condition coordinate with the action of said pulsation responsive means.

18. In an electric signaling system the combination of a plurality of transmitters each comprising circuit interrupting means and actuating means therefor and electrically withdrawable detaining means for said circuit interrupting means whereby the transmitters are capable of being placed in condition to effect line pulsations and capable of maintaining such condition pending establishment of a circuit individually therethrough, a central control and receiving station for all transmitters, a transmitter selector having selective connection to each transmitter individually, a line connection consisting of a single circuit between said transmitter selector and said central control and receiving station, electrically responsive means associated with each transmitter for effecting withdrawal of the transmitter detaining means, control means in said central station effective by way of said transmitter selector to a selected transmitter to cause action in said electrically responsive means eventuating in transmitter release, counting means in said central control and receiving station, means in said central control and receiving station responsive in action to line pulsations originating at a transmitter connected with said station by way of the transmitter selector, and connection between said counting means and said pulsation responsive means for progressive actuation thereby to a condition coordinate with the action of said pulsation responsive means, recording means operatively associated with said counting means for actuation in accordance with the condition of said counting means, and circuit control means associated with said recording means and actuated by action of the recording means to control a circuit to said control means of the central station to initiate action restoring the control means to initial message receiving condition.

19. In an electric signaling system the combination of a plurality of transmitters each comprising circuit interrupting means and actuating means therefor and electrically withdrawable detaining means for said circuit interrupting means whereby the transmitters are capable of being placed in condition to effect line pulsations and capable of maintaining such condition pending establishment of a circuit individually therethrough, a central control and receiving station for all the transmitters, a transmitter selector remote from the central control and receiving station, a control circuit from said central station to said transmitter selector controlling action of said selector, current source and current control means in said central station effective instantaneously upon operative connection of a transmitter which is in condition for transmission with said central station by way of said transmitter selector to prevent action of said selector and maintain said transmitter operatively in circuit with the central station, electrical connections to the withdrawable transmitter detaining means cooperatively active in effecting transmitter release, counting means in said central control and receiving station, means in said central control and receiving station responsive in action to line pulsations originating at a transmitter connected with said central station by way of the transmitter selector, and connection between said counting means and said pulsation responsive means for progressive actuation of the counting means to a condition coordinate with the action of said pulsation responsive means, recording means operatively associated with said counting means for actuation in accordance with the condition of said counting means, and circuit control means associated with said recording means and actuated by action of the recording means to control a circuit to the said control means of the central station to initiate action restoring the control means to initial message receiving condition and acting upon the transmitter selector by way of the control circuit thereto to restore said selector to transmitter selecting activity.

VIRGIL H. DAKE.